United States Patent
D'Oro et al.

(10) Patent No.: US 11,956,763 B2
(45) Date of Patent: Apr. 9, 2024

(54) METHODS FOR THE ENFORCEMENT OF NETWORK SLICING POLICIES IN VIRTUALIZED CELLULAR NETWORKS

(71) Applicant: Northeastern University, Boston, MA (US)

(72) Inventors: Salvatore D'Oro, Allston, MA (US); Francesco Restuccia, Boston, MA (US); Tommaso Melodia, Newton, MA (US)

(73) Assignee: Northeastern University, Boston, MA (US)

( * ) Notice: Subject to any disclaimer, the term of this patent is extended or adjusted under 35 U.S.C. 154(b) by 341 days.

(21) Appl. No.: 17/424,522

(22) PCT Filed: Jan. 24, 2020

(86) PCT No.: PCT/US2020/014896
§ 371 (c)(1),
(2) Date: Jul. 21, 2021

(87) PCT Pub. No.: WO2020/154564
PCT Pub. Date: Jul. 30, 2020

(65) Prior Publication Data
US 2022/0141821 A1    May 5, 2022

Related U.S. Application Data

(60) Provisional application No. 62/796,780, filed on Jan. 25, 2019.

(51) Int. Cl.
*H04W 72/0453* (2023.01)
*H04W 16/10* (2009.01)
(Continued)

(52) U.S. Cl.
CPC ....... *H04W 72/0453* (2013.01); *H04W 16/10* (2013.01); *H04W 16/14* (2013.01); *H04W 48/18* (2013.01); *H04W 84/04* (2013.01)

(58) Field of Classification Search
CPC ............. H04L 41/5019; H04L 41/0894; H04L 41/0895; H04L 41/40; H04L 41/0893;
(Continued)

(56) References Cited

U.S. PATENT DOCUMENTS

2016/0353465 A1* 12/2016 Vrzic .................. H04L 41/5054
2017/0164349 A1*  6/2017 Zhu ........................ H04W 72/51
(Continued)

FOREIGN PATENT DOCUMENTS

CN    112601257 A  *  4/2021  ............ H04W 28/06
WO    2017143047 A1    8/2017
(Continued)

OTHER PUBLICATIONS

Foukas et al., "Orion: RAN Slicing for a Flexible and Cost-Effective Multi-Service Mobile Network Architecture," Proc. of ACM Intl. Conf. on Mobile Computing and Networking (MobiCom), 2017, pp. 127-140.
(Continued)

Primary Examiner — Matthew C Sams
(74) Attorney, Agent, or Firm — Verrill Dana, LLP

(57) ABSTRACT

Methods and systems for allocating radio access network (RAN) spectrum resources among a plurality of mobile virtual network operators (MVNOs) of a network of base stations. The methods and systems include determining a slicing enforcement policy that assigns resource blocks (RBs) of frequency units and time slots of spectrum resources to each MVNO according to a slicing policy in which each MVNO is allocated an amount of the spectrum resources on at least one base station in a determined time
(Continued)

span. The slicing enforcement policy minimizes overlap between each MVNO's set of RBs with another MVNO's set of RBs on a same base station, and interference between each MVNO's set of RBs with another MVNO's set of RBs on an interfering base station.

16 Claims, 13 Drawing Sheets

(51) Int. Cl.
*H04W 16/14* (2009.01)
*H04W 48/18* (2009.01)
*H04W 84/04* (2009.01)

(58) Field of Classification Search
CPC ..... H04W 16/10; H04W 16/14; H04W 48/18; H04W 72/0453; H04W 84/04
See application file for complete search history.

(56) References Cited

U.S. PATENT DOCUMENTS

2017/0332421 A1 11/2017 Sternberg et al.
2019/0007899 A1* 1/2019 Vrzic .................. H04W 8/02

FOREIGN PATENT DOCUMENTS

WO WO-2020154564 A1 * 7/2020 ......... H04L 41/0806
WO WO-2021073329 A1 * 4/2021

OTHER PUBLICATIONS

Afolabi et al., "Network Slicing & Softwarization: A Survey on Principles, Enabling Technologies & Solutions," IEEE Communications Surveys & Tutorials, vol. 20, No. 3, 2018, pp. 2429-2453.

Kaloxylos, A., "A Survey and an Analysis of Network Slicing in 5G Networks," IEEE Communications Standards Magazine, 2018, pp. 60-65.

Samdanis et al., "5G Network Slicing—Part 1: Concepts, Principles, and Architectures," IEEE Communications Magazine, vol. 55, No. 5, May 2017, pp. 70-71.

Sallent et al., "On Radio Access Network Slicing from a Radio Resource Management Perspective," IEEE Wireless Communications, vol. 24, No. 5, 2017, pp. 166-174.

Ferrús et al., "On 5G Radio Access Network Slicing: Radio Interface Protocol Features and Configuration," IEEE Communications Magazine, vol. 56, No. 5, May 2018, pp. 184-192.

Zhao et al., "Information Prediction and Dynamic Programming Based RAN Slicing for Mobile Edge Computing," IEEE Wireless Communications Letters, vol. 7, No. 4, 2018, pp. 614-617.

Caballero et al., "Multi-Tenant Radio Access Network Slicing: Statistical Multiplexing of Spatial Loads," IEEE/ACM Transactions on Networking, vol. 25, No. 5, 2017, pp. 3044-3058.

Vo et al., "Slicing the Edge: Resource Allocation for RAN Network Slicing," IEEE Wireless Communications Letters, vol. 7, No. 6, 2018, pp. 970-973.

Mahindra et al., "Radio Access Network Sharing in Cellular Networks," Proc. Of IEEE Intl. Conf. on Network Protocols (ICNP), 2013, 10 pages.

Talamonti, "Enforcing Radio Access Network Slicing in Virtualized 5G Systems," Politesi digital archive of PhD and post graduate theses, 2018, 93 pages; retrieved on Mar. 27, 2020 from the internet <www.politesi.polimi.it/handle/10589/142959>.

D'Oro et al., "A Learning Approach for Low-Complexity Optimization of Energy Efficiency in Multicarrier Wireless Networks," IEEE Transactions on Wireless Communications, vol. 17, No. 5, 2018, 16 pages; arXiv: 1802.09591v1 [cs.NI] Feb. 26, 2018.

D'Oro et al., "Low-Complexity Distributed Radio Access Network Slicing: Algorithms and Experimental Results," IEEE/ACM Transactions on Networking, vol. 26, No. 6, 2018, 16 pages.

Gebremariam et al., SoftSLICE: Policy-Based Dynamic Spectrum Slicing in 5G Cellular Networks, Proc. of IEEE Intl. Conf. on Communications (ICC), May 2018, 7 pages.

* cited by examiner

METHODS FOR THE ENFORCEMENT OF NETWORK SLICING POLICIES IN VIRTUALIZED CELLULAR NETWORKS

CROSS REFERENCE TO RELATED APPLICATIONS

This application claims priority under 35 U.S.C. § 119(e) of U.S. Provisional Application No. 62/796,780, filed on 25 Jan. 2019, entitled "Methods for the Enforcement of Network Slicing Policies in Virtualized Cellular Networks," the disclosure of which is hereby incorporated by reference.

STATEMENT REGARDING FEDERALLY SPONSORED RESEARCH OR DEVELOPMENT

This invention was made with government support under Grant Numbers N00014-16-1-2213 and N00014-17-1-2046 awarded by the Office of Naval Research and Grant Number CNS-1618727 awarded by the National Science Foundation. The government has certain rights in the invention.

BACKGROUND

The demand for faster, lower-latency wireless cellular connection is growing exponentially each year. Traditionally, all network resources have been owned by a single entity. However, softwarization and virtualization of the radio access network (RAN) of next-generation (5G) wireless systems are leading to applications and services becoming physically decoupled from devices and network infrastructure. This decoupling can enable the dynamic deployment of heterogeneous services by different network operators over the same physical infrastructure. RAN slicing is a virtualization technology that partitions radio resources into multiple autonomous virtual networks, to allow network infrastructure providers (IPs) to dynamically allocate their network resources (i.e., spectrum, power, antennas, among others) to different mobile virtual network operators (MVNOs), according to their current needs. RAN slicing can be tailored to provide diverse performance requirements.

SUMMARY

The technology described herein provides a mechanism that enables and enforces Radio Access Network (RAN) slicing in virtualized 5G and other networks. The technology allows the efficient sharing of a physical network infrastructure among multiple MVNOs. Each MVNO is assigned a "slice" of network spectrum resources according to a slicing policy, which can be allocated and/or revoked by a network infrastructure provider. The technology provides a RAN slicing enforcement problem (RSEP) that is mathematically formalized and several approximation solutions to the RSEP are provided by which the spectrum resources can be allocated to each MVNO. The techniques can render the solution scalable as the RSEP increases in size.

Features of the technology include:
1. A method of allocating radio access network (RAN) spectrum resources among a plurality of mobile virtual network operators (MVNOs) of a network of base stations, each base station operative to transmit and receive signals over a coverage area, comprising:
   (a) determining a slicing enforcement policy comprising assigning a set of one or more resource blocks (RBs) to each MVNO according to a slicing policy in which each MVNO is allocated an amount of the spectrum resources on at least one base station in a determined time span, each resource block including a number of available frequency units and time slots of the spectrum resources, subject to minimizing interference between each MVNO's set of RBs with another MVNO's set of RBs on an interfering base station, wherein adjacent base stations are interfering when coverage areas of the adjacent base stations overlap; and
   (b) allocating the resource blocks of the spectrum resources to each MVNO based on the slicing enforcement policy.

2. The method of feature 1, wherein step (a) further comprises:
   assigning to at least one of the MVNOs a plurality of linked RBs, wherein the linked RBs have a same frequency unit and a same time slot in interfering base stations; and
   maximizing a number of linked RBs assigned to a same MVNO on interfering base stations.

3. The method of any of features 1-2, wherein step (a) further comprises:
   generating a set of slicing profiles for each of the MVNOs and the plurality of base stations, the slicing profile comprising the amount of the spectrum resources to allocated to each MVNO on each base station in a determined time span; and maximizing a number of linked RBs for each MVNO from a set of feasible slicing enforcement policies, wherein the linked RBs have a same frequency unit and a same time slot in interfering base stations.

4. The method of any of features 1-3, wherein step (a) further comprises:
   generating a RAN slicing enforcement problem (RSEP) comprising determining a feasible slicing enforcement policy that maximizes a total number of linked RBs allocated to MVNOs that request a highest amount of resource blocks on multiple interfering base stations, wherein the linked RBs have a same frequency unit and a same time slot in interfering base stations; and assigning the RBs to the MVNOs according to the RSEP.

5. The method of any of features 1-4, wherein generating the RSEP further comprises maximizing a number of linked RBs for each MVNO based on a selected binary resource block allocation indicator x, wherein x=1 for each resource block that has been allocated to a particular MVNO, subject to ensuring that all MVNOs receive an assigned number of resource blocks and that each resource block is allocated to only one MVNO.

6. The method of any of features 1-5, wherein generating the RSEP further comprises maximizing a number of linked RBs for each MVNO based on a selected resource block allocation indicator x, wherein x is approximated by a linear relaxation so that $0 \leq x \leq 1$ for each resource block that has been allocated to a particular MVNO, subject to ensuring that all MVNOs receive an assigned number of resource blocks and that each resource block is allocated to only one MVNO.

7. The method of any of features 1-6, wherein generating the RSEP further comprises:
   generating a linking index for each MVNO based on a size of a request by each MVNO for resource blocks on multiple interfering base stations; and
   allocating resource blocks in sequential order starting with an MVNO with a highest linking index.

8. The method of any of features 1-7, further comprising:
   generating a RB allocation matrix of allocated RBs having rows corresponding to base stations;

removing a row with a smallest number of distinct MVNOs;

swapping elements of the RB allocation matrix;

updating the RB allocation matrix if a total number of linked RBs is increased.

9. The method of any of features 1-8, wherein generating the RSEP further comprises aggregating RBs into a group if a number of RBs or a number of time slots T are proportional to a greatest common divisor of all elements in a slicing profile matrix L of amounts of resources allocable to each MVNO on each base station in a determined time span.

10. The method of any of features 1-9, wherein generating the RSEP further comprising determining non-zero entries of matrices of elements representing interfering base station, a number of RBs, a number of time slots and a number of MVNOs.

11. The method of any of features 1-10, wherein step (a) further comprises maximizing a number of simultaneous transmissions on different base stations by any one or more of the MVNOs.

12. The method of any of features 1-11, wherein step (a) further comprises allocating the spectrum resources according to a transmission strategy implemented by one or more of the MVNOs, the transmission strategy comprising one or more of an inter-base-station power control scheme, a multiple-input multiple output scheme, a coordinated multipoint scheme, a joint transmission scheme, and coordinated beamforming.

13. The method of any of features 1-12, wherein step (a) further comprises allocating the spectrum resources according to requests from the MVNOs.

14. The method of any of features 1-13, wherein step (a) further comprises determining the slicing enforcement policy subject to minimizing overlap between each MVNO's set of RBs with another MVNO's set of RBs on a same base station.

15. A system of allocating radio access network (RAN) spectrum resources among a plurality of mobile virtual network operators (MVNOs) of a network of base stations, each base station operative to transmit and receive signals over a coverage area, comprising:

a computer system comprising one or more processors and memory, and machine-readable instructions stored in the memory that upon execution by the one or more processors cause the system to carry out operations comprising the method of any of features 1-14.

16. A system of allocating radio access network (RAN) spectrum resources among a plurality of mobile virtual network operators (MVNOs) of a network of base stations, each base station operative to transmit and receive signals over a coverage area, comprising:

a computer system comprising one or more processors and memory, and machine-readable instructions stored in the memory that upon execution by the one or more processors cause the system to carry out operations comprising:

(a) determining a slicing enforcement policy comprising assigning a set of one or more resource blocks (RBs) to each MVNO according to a slicing policy in which each MVNO is allocated an amount of the spectrum resources on at least one base station in a determined time span, each resource block including a number of available frequency units and time slots of the spectrum resources, subject to minimizing interference between each MVNO's set of RBs with another MVNO's set of RBs on an interfering base station, wherein adjacent base stations are interfering when coverage areas of the adjacent base stations overlap; and (b) allocating the resource blocks of the spectrum resources to each MVNO based on the slicing enforcement policy.

17. The system of feature 16, wherein step (a) further comprises:

assigning to at least one of the MVNOs a plurality of linked RBs, wherein the linked RBs have a same frequency unit and a same time slot in interfering base stations; and maximizing a number of linked RBs assigned to a same MVNO on interfering base stations.

18. The system of any of features 16-17, wherein step (a) further comprises:

generating a set of slicing profiles for each of the MVNOs and the plurality of base stations, the slicing profile comprising the amount of the spectrum resources to allocated to each MVNO on each base station in a determined time span; and maximizing a number of linked RBs for each MVNO from a set of feasible slicing enforcement policies, wherein the linked RBs have a same frequency unit and a same time slot in interfering base stations.

19. The system of any of features 16-18, wherein step (a) further comprises:

generating a RAN slicing enforcement problem (RSEP) comprising determining a feasible slicing enforcement policy that maximizes a total number of linked RBs allocated to MVNOs that request a highest amount of resource blocks on multiple interfering base stations, wherein the linked RBs have a same frequency unit and a same time slot in interfering base stations; and assigning the RBs to the MVNOs according to the RSEP.

20. The system of any of features 16-19, wherein generating the RSEP further comprises maximizing a number of linked RBs for each MVNO based on a selected binary resource block allocation indicator x, wherein x=1 for each resource block that has been allocated to a particular MVNO, subject to ensuring that all MVNOs receive an assigned number of resource blocks and that each resource block is allocated to only one MVNO.

21. The system of any of features 16-20, wherein generating the RSEP further comprises maximizing a number of linked RBs for each MVNO based on a selected resource block allocation indicator x, wherein x is approximated by a linear relaxation so that $0 \le x \le 1$ for each resource block that has been allocated to a particular MVNO, subject to ensuring that all MVNOs receive an assigned number of resource blocks and that each resource block is allocated to only one MVNO.

22. The system of any of features 16-21, wherein generating the RSEP further comprises:

generating a linking index for each MVNO based on a size of a request by each MVNO for resource blocks on multiple interfering base stations; and allocating resource blocks in sequential order starting with an MVNO with a highest linking index.

23. The system of any of features 16-22, further comprising:

generating a RB allocation matrix of allocated RBs having rows corresponding to base stations;

removing a row with a smallest number of distinct MVNOs;

swapping elements of the RB allocation matrix;

updating the RB allocation matrix if a total number of linked RBs is increased.

24. The system of any of features 16-23, wherein generating the RSEP further comprises aggregating RBs into a group if a number of RBs or a number of time slots T are proportional to a greatest common divisor of all elements in a slicing profile matrix L of amounts of resources allocable to each MVNO on each base station in a determined time span.

25. The system of any of features 16-24, wherein generating the RSEP further comprising determining non-zero entries of matrices of elements representing interfering base station, a number of RBs, a number of time slots and a number of MVNOs.

26. The system of any of features 16-25, wherein step (a) further comprises maximizing a number of simultaneous transmissions on different base stations by any one or more of the MVNOs.

27. The system of any of features 16-26, wherein step (a) further comprises allocating the spectrum resources according to a transmission strategy implemented by one or more of the MVNOs, the transmission strategy comprising one or more of an inter-base-station power control scheme, a multiple-input multiple output scheme, a coordinated multipoint scheme, a joint transmission scheme, and coordinated beamforming.

28. The system of any of features 16-27, wherein step (a) further comprises allocating the spectrum resources according to requests from the MVNOs.

29. The system of any of features 16-28, wherein step (a) further comprises determining the slicing enforcement policy subject to minimizing overlap between each MVNO's set of RBs with another MVNO's set of RBs on a same base station.

DETAILED DESCRIPTION

The technology described herein provides methods and systems of allocating radio access network (RAN) spectrum resources among a plurality of mobile virtual network operators (MVNOs). The technology provides a radio access network (RAN) slicing approach in which physical network infrastructure is shared among multiple MVNOs, each one in charge of a separate "slice" of the network, which can be assigned and/or revoked by the infrastructure provider (IP) or other network owner (NO) according to the IP's current slicing policy. RAN slicing addresses a problem in which spectrum is a scarce resource for which over-provisioning is not possible, and interference jeopardizes isolation across slices belonging to different MVNOs, thus resulting in performance degradation if not handled properly. However, existing one-size-fits-all resource allocation policies cannot sustain the need for dynamic, effective and efficient radio access strategies, where network operators need to make the best use of the extremely limited spectrum bands available for commercial usage.

The present technology provides RAN slicing techniques or strategies that can partition radio resources so as to leverage coordination among multiple base stations and thus boost network throughput. The RAN slicing techniques can reduce interference across different slices to provide slice isolation and avoid or minimize performance degradation.

Once the RAN slices have been defined for each MVNO, the spectrum resources, also called resource blocks (RBs), can be divided and allocated according to what is prescribed by the slicing policy. For example, if an MVNO has been assigned a slice of 15% of the spectrum resources, such MVNO should receive approximately 15% of the available RBs. Thus, RAN slicing enforcement algorithms are provided to implement in practice the IP's slicing policy. Moreover, to be effective, RAN slicing enforcement algorithms can facilitate interference-mitigating strategies such as inter-base-station power control (IBSPC), multiple-in multiple-out (MIMO), and coordinated multi-point (CoMP) schemes such as Joint Transmission (JT). However, since such schemes require tight cooperation and coordination among different base stations (BSs), the technology described herein can further provide effective and efficient slicing enforcement algorithms to guarantee that the same or similar in time/frequency RBs are assigned to the same MVNOs when BSs are close enough to interfere among themselves.

Figure 1:
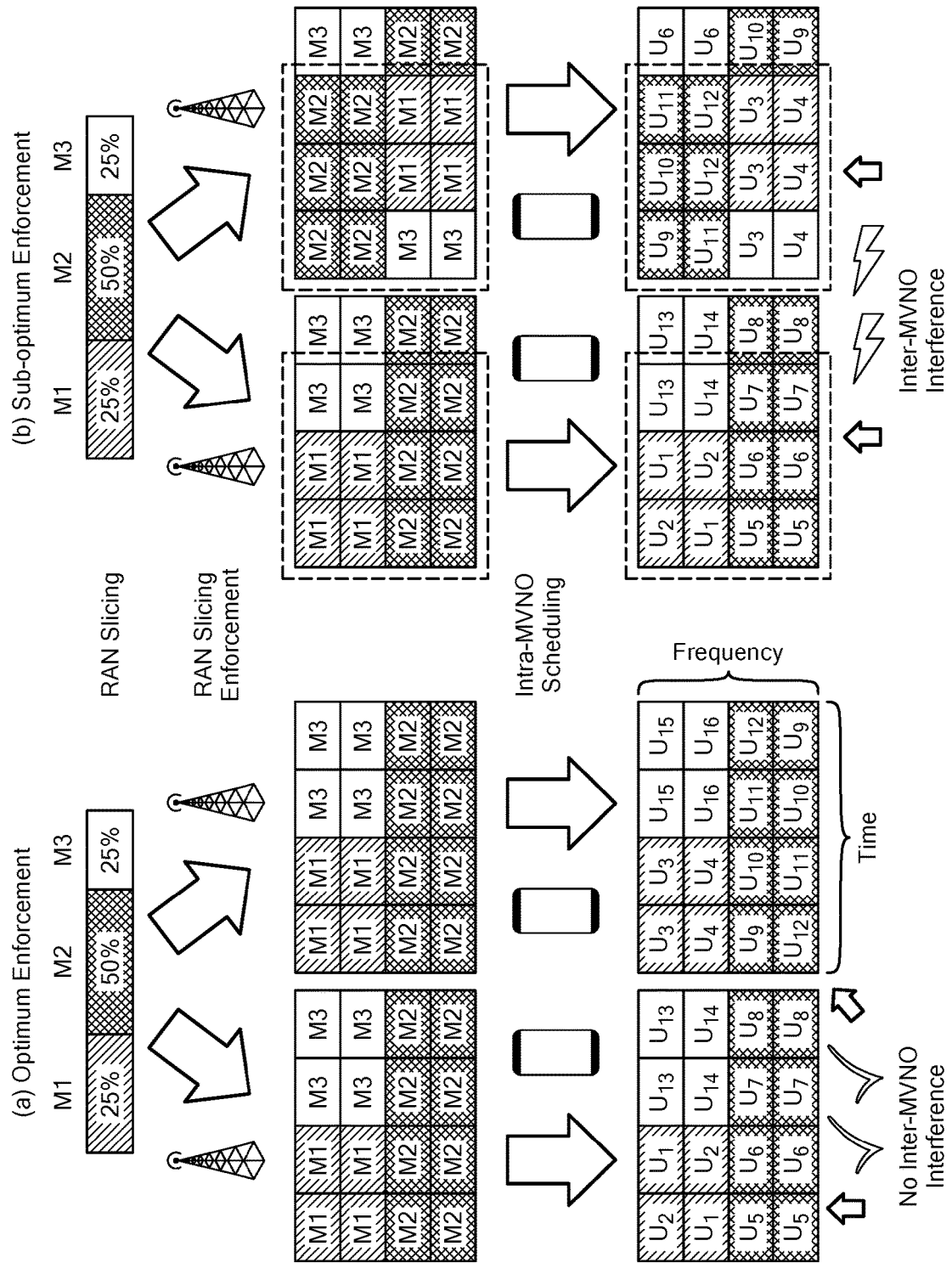
FIG. 1 is a schematic illustration on (a) optimum RAN slicing enforcement; and (b) sub-optimum RAN slicing enforcement.
Figure 2:
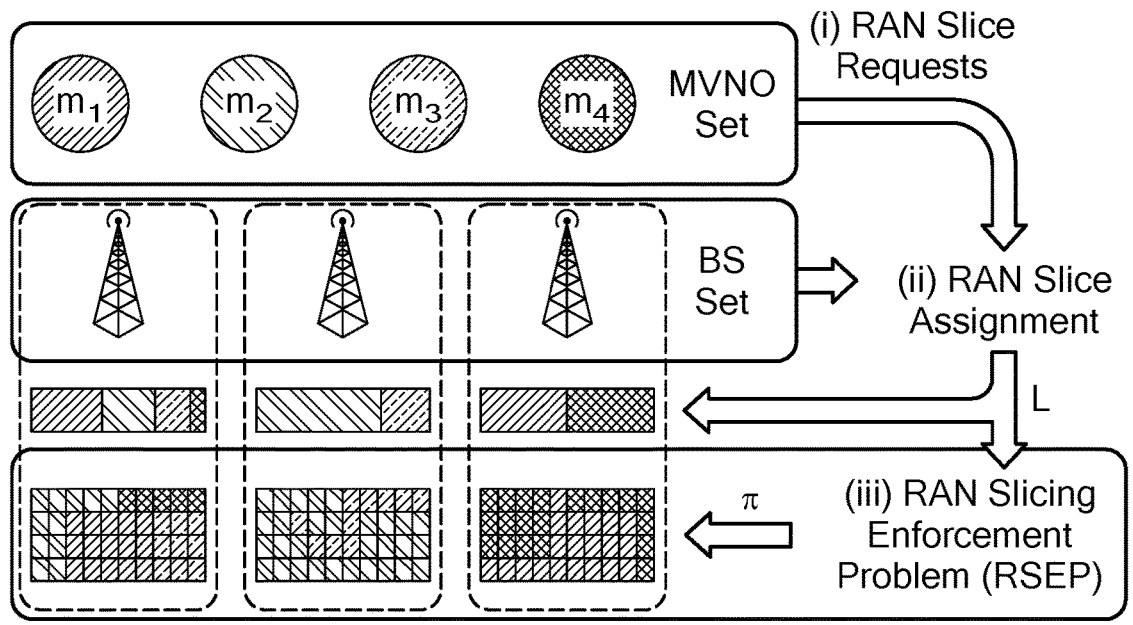
FIG. 2 is a schematic illustration of RAN slicing architecture.

To illustrate this point, consider a cellular network scenario as depicted in FIG. 1. Here, the network owner administers two BSs (assumed to be close enough to interfere with each other) and 16 RBs (i.e., 4 frequency units during 4 time units). Consider the case where three MVNOs, namely M1, M2 and M3, have been assigned the following slice: M1=25%, M2=50%, M3=25%, on both the BSs. FIG. 1(a) shows an optimum slicing enforcement, represented as two RB allocation matrices (RBAM), where inter-MVNO interference is absent (i.e., MVNOs control the same RBs at the two BSs). In this case, MVNOs have maximum flexibility and can easily mitigate interference between their mobile users (MUs) residing in the two BSs by using IBSPC. Conversely, FIG. 1(b) shows sub-optimum RBAMs, which cause inter-MVNO interference during 12 RBs (illustrated within the dashed lines).

The present technology can address the problem of physical-level allocation of spectrum resources to MVNOs. The technology provides slicing enforcement methods and systems that can address one or more of the following:

1) Enabling of advanced 5G technologies: Advanced signal processing and RF transmission technologies such as IBSPC, JT, CoMP and MIMO, can improve network performance, but require coordination among BSs in proximity. The RB allocation should facilitate and foster such coordination if possible.
2) Isolation or Orthogonality: Orthogonality among each RAN slice can increase efficiency. That is, each RB should be allocated to only one MVNO to avoid interference and other performance-degrading factors.
3) Feasibility or Contract Compliance: MVNOs stipulate contracts with the IP to obtain control over the amount or resources specified by the slicing policy. If a slicing policy assigns an MVNO 30% of spectrum resources by the IP (and for which the MVNO pays), then the MVNO should receive 30% of the total RBs available.

In contrast to prior work that provides high-level orchestration platforms that virtualize the available resources to create pools of resources that are then shared and allocated among the MVNOs, the present technology, instead, can provide a fine-grained and low-level control of physical-layer resources that enables 5G technologies such as MIMO, Coordinated Multi-Point (CoMP) and beamforming transmissions through interference mitigation and optimal resource allocation algorithms.

The technology can provide RAN resource allocation with one or more of the following: (i) it satisfies MVNOs requests, (ii) it enforces orthogonality by reducing inter-MVNO interference, and (iii) it enables advanced communication techniques such as CoMP and coordinated beamforming by maximizing the number of simultaneous MVNO transmissions on different base stations. More particularly, a formulation of the RAN slicing enforcement problem (RSEP) is provided where interference among different MVNOs is reduced through orthogonal allocation of physical-layer resources, thus effectively improving network performance in terms of throughput and signal-to-noise ratio (SNR) or signal-to-interference-plus-noise ratio (SINR). The RSEP is formulated as an integer linear problem (ILP) where the number of physical-layer resources with zero inter-MVNO interference is maximized and all MVNOs receive the or at least a minimum amount of requested resources.

The technology provides methods and systems that can be automated and can dynamically adapt to traffic and data patterns. Accordingly, they can 1) find the most profitable allocation of network resources and avoid inefficiencies; and 2) enable advanced communication technologies that provide better QoS levels to network users.

The technology can provide efficient and effective management and allocation of network slices in 5G networks. It can provide for the allocation of physical-layer resources to enable the implementation of various transmission strategies, such as inter-base-station power control (IBSPC), coordinate multi-point (CoMP), multi-input multiple output (MIMO), joint transmission (JT), and coordinated beamforming transmissions. It can facilitate development of a network slicing platform for rapid and flexible network slice generation. It can provide network slicing for Internet of Things (IoT), 3G, 4G and WiFi networks, and/or millimeter wave applications.

The present technology provides a formulation of the RAN slicing enforcement problem (RSEP) that can (i) satisfy MVNOs' requests, (ii) enforce orthogonality by reducing inter-MVNO interference, and (iii) enable advanced communication techniques such as CoMP and coordinated beamforming by maximizing the number of simultaneous MVNO transmissions on different BSs. It shows how to implement a deployment of RAN slices on top of the underlying physical network, which is not addressed by solutions that use a variety of theoretical tools, such as optimization, auctions, and game theory. The present technology can be effective in scenarios where a more fine-grained control of physical-layer resources is desirable, for example, to enable IBSPC, CoMP and beamforming transmissions, in contrast to high-level orchestration platforms that virtualize the available resources to create pools of resources that are then shared and allocated among the MVNOs. The technology can be applied in multi-cell networks where MNVOs request different amounts of resources on different BSs. The present technology provides algorithms to enforce slicing policies to maximize network efficiency while considering interference among BSs when allocating RBs.

The present technology can provide methods and systems of allocating radio access network (RAN) spectrum resources among a plurality of mobile virtual network operators (MVNOs) of a network of base stations, each base station operative to transmit and receive signals over a coverage area, comprising: (a) determining a slicing enforcement policy comprising assigning a set of one or more resource blocks (RBs) to each MVNO according to a slicing policy in which each MVNO is allocated an amount of the spectrum resources on at least one base station in a determined time span, each resource block including a number of available frequency units and time slots of the spectrum resources, subject to minimizing interference between each MVNO's set of RBs with another MVNO's set of RBs on an interfering base station, wherein adjacent base stations are interfering when coverage areas of the adjacent base stations overlap; and (b) allocating the resource blocks of the spectrum resources to each MVNO based on the slicing enforcement policy.

As described further below, the present technology describes and evaluates RAN slicing enforcement algorithms and methods that address the challenges noted above. In particular, Section I provides a system model overview. Section II provides a formulation of the RAN slicing enforcement problem (RSEP). Section III provides solutions to the RSEP. An optimal solution, termed RSEP-QP, is described in Section III-A and shown to be NP-hard. An approximated solution of RSEP-QP, termed RSEP-EQ, is described in Section III-B. A first heuristic algorithm, termed RSEP-MLF, is described in Section III-C and a second heuristic algorithm, termed RSEP-IMLF, an improvement on RSEP-MLF, is described in Section III-D. In Section III-E, it is shown that the execution time of both RSEP-QP and RSEP-EQ can be further reduced under specific conditions by solving an equivalent problem leveraging properties of sparsity and RB aggregation. The performance of the described methods and systems is evaluated through simulations and experiments described in Section IV.

I. SYSTEM MODEL AND PROBLEM OVERVIEW

Figure 3:
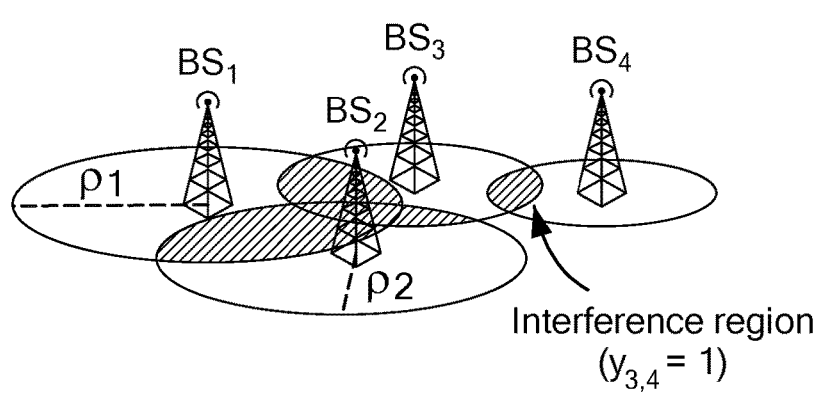
FIG. 3 is a schematic illustrative example with 4 base stations and their corresponding adjacency matrix Y. Shaded areas show interference (or adjacency) regions.
Figure 4:
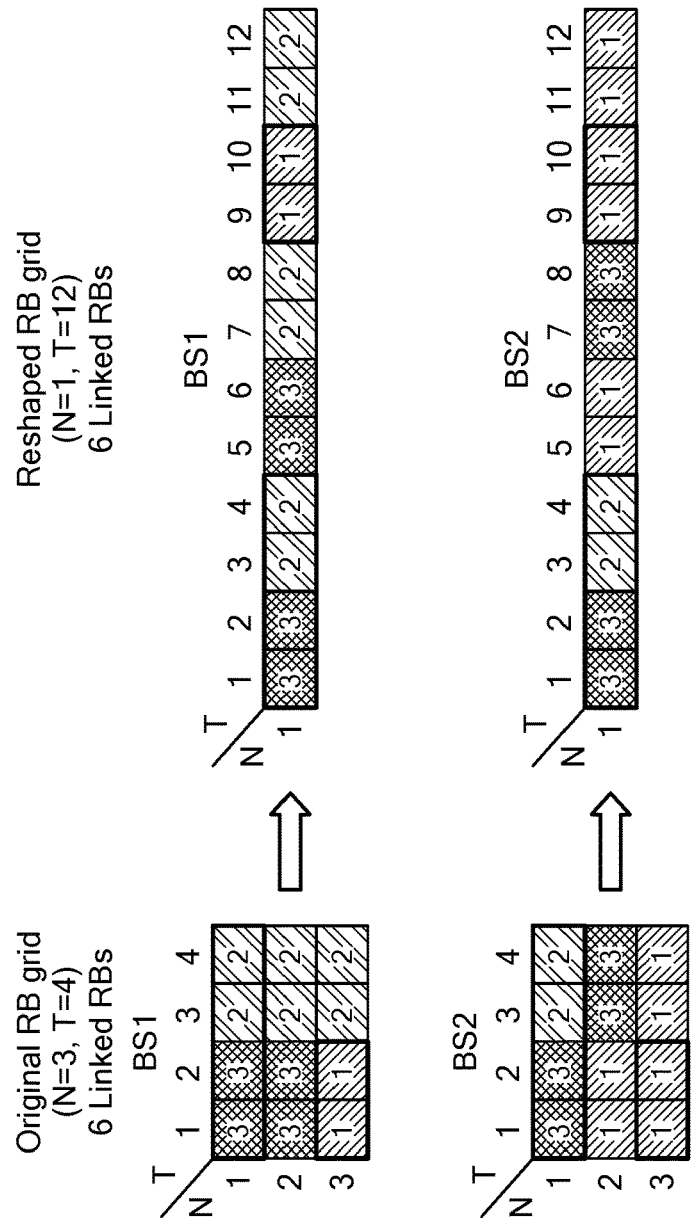
FIG. 4 is a schematic illustrative example of a RB grid reshaping with B=2 BSs, M=3 MVNOs and 6 linked RBs. The original RB grid is shown on the left, while the reshaped grid is shown on the right.

Consider the RAN shown in FIGS. 3 and 4, having a set $\mathcal{B}=\{1, 2, \ldots, B\}$ of B base stations (BSs), each associated with a coverage area $\rho_b$, $b \in \mathcal{B}$. Two BSs b and b' are interfering (or adjacent) with each other if $\rho_b \cap \rho'_b \neq \emptyset$. Define $Y=(y_{b,b'})_{b,b' \in D}$ as a symmetric adjacency matrix such that $y_{b,b}=0$ for all $b \in \mathcal{B}$, $y_{b,b'}=1$ if BSs b and b' interfere with each other, and $y_{b,b'}=0$ otherwise.

The RAN is administered by an IP, who periodically rents virtual RAN slices built on top of the underlying physical network $\mathcal{B}$ to a set $\mathcal{M}=\{1, 2, \ldots, M\}$ of M MVNOs. Without loss of generality, assume RAN slices are valid for T time slots. This way, slow-changing networks (e.g., cellular networks in rural areas during nighttime) can be modeled with large values of T, while small values of T can be used to model fast-changing networks (e.g., urban areas during daytime).

TABLE 1

Summary of Notation

| Variable | Description |
|---|---|
| $\mathcal{B}$ | Set of base stations (BSs) |
| $\mathcal{M}$ | Set of mobile virtual network operators (MVNOs) |
| Y | Adjacency matrix |
| $N_{RB}$ | Number of available subcarriers |
| T | Number of temporal slots within the slicing window |
| $\mathcal{R}$ | Set of the available resources at each BS, $|\mathcal{R}| = N_{RB} \cdot T$ |
| L | RAN slicing profile |
| $\mathcal{M}_b$ | Set of MVNOs including BS b in their RAN slice |
| $x_{m,b,n,t}$ | RB allocation indicator |
| $\pi$ | Slicing enforcement policy |
| $\Pi$ | Set of all feasible slicing enforcement policies $\pi$ |

In line with 5G NR and LTE standards, spectrum resources are represented as RBs, where each RB represents a minimum scheduling unit. Also considered is an OFDMA channel access scheme where RBs are organized as a time-frequency resource grid, with $N_{RB}$ subcarriers and T temporal time slots. Thus, the set of available resources at each BS is $\mathcal{R}$, with $\mathcal{R} = N_{RB} \cdot T$, where each RB in $\mathcal{R}$ can be represented as a 2-tuple (n,t) with $n=1, 2, \ldots, N_{RB}$ and $t=1, 2, \ldots, T$.

The interaction between MVNOs and the IP can be summarized with reference to FIG. 3. First, (i) MVNOs' RAN slice requests are collected by the IP. Then, (ii) the IP determines which requests should be admitted to the system, and generates a slicing profile $L=(L_{m,b})_{m \in \mathcal{M}, b \in \mathcal{B}}$ where $L_{m,b}$ represents the amount of resources that the IP should allocate to MVNO $m \in \mathcal{M}$ on BS b in the time span $0 \leq t \leq T$ (i.e., RAN Slice Assignment); and (iii) computes a slicing enforcement policy $\pi$ that allocates RBs among the MVNOs such that all MVNOs' requests are satisfied (i.e., RAN Slice Enforcement).

Regarding point (iii) specifically, it is shown how the IP can compute an efficient slicing enforcement policy $\pi$ that can satisfy one or more of the challenges described above, for example, enabling of advanced technologies, isolation or orthogonality, and feasibility or contract compliance.

II. THE RAN SLICING ENFORCEMENT PROBLEM (RSEP)

For any given slicing profile L and BS b, the subset $\mathcal{M}_b \subseteq \mathcal{M}$ of MVNOs that include BS b in their RAN slice can be identified as $\mathcal{M}_b = \{m \in \mathcal{M} : L_{m,b} > 0\}$.

Let $x_{m,b,n,t} \in \{0, 1\}$ be the RB allocation indicator such that $x_{m,b,n,t}=1$ if RB $(n, t) \in \mathcal{R}$ is allocated to MVNO m, $x_{m,b,n,t}=0$ otherwise. Also, let $\pi=(\pi_b)_{b \in \mathcal{B}}$ be the slicing enforcement policy, where $\pi_b=(\pi_{m,b})_{m \in \mathcal{M}}$ and $\pi_{m,b}$ represents the set of RBs on BS b that are allocated to MVNO m. In more detail, for any RB $(n, t) \in \mathcal{R}$, then $(n, t) \in \pi_{m,b} \Leftrightarrow x_{m,b,n,t}=1$. Hence, the set $\Pi$ of all feasible slicing enforcement policies $\pi$ can be defined as:

$$\Pi = \{\pi = (\pi_{m,b})_{m \in \mathcal{M}, b \in \mathcal{B}} : |\pi_{m,b}| = L_{m,b} \wedge \pi_{m,b} \cap \pi_{m',b} = \emptyset \\ \forall m \neq m', m, m' \in \mathcal{M}, b \in \mathcal{B}\} \quad (1)$$

To properly formulate the RSEP, linked RBs are defined as follows:

Definition 1 (Linked RBs). A given RB (n, t) on the resource grid is linked to MVNO m on two interfering BS b and b' if and only if $x_{m,b,n,t}=x_{m,b',n,t}=1$ and $y_{b,b'}=1$.

Linked RBs indicate those RBs that have been assigned to the same MVNO on adjacent BSs. Specifically, a linked RB allows the corresponding MVNO to simultaneously access a specific spectrum portion in the same time slot from two or more BSs.

This feature is relevant because (i) MVNOs can use linked RBs to enable advanced transmission schemes (e.g., distributed beamforming, MIMO, CoMP transmissions, power control) among nearby BSs; (ii) as shown in FIG. 1, linked RBs can be used to deploy fully-orthogonal RAN slices that do not interfere with each other; and (iii) linked RBs do not generate inter-MVNO interference, thus avoiding any need for centralized coordination or distributed coordination among MVNOs.

Maximization of the number of simultaneously linked RBs can address the challenges identified above. Leveraging the concept of linked RBs, for each MVNO m, the number of linked RBs associated to interfering BSs b and b', i.e., $y_{b,b'}=1$, is defined as follows:

$$n_{b,b',m} = y_{b,b'} |\pi_{m,b} \cap \pi_{m,b'}|, \quad (2)$$

where the relationship $\pi_{b,b', m} = n_{b',b,m}$ always holds for all b, $b' \in \mathcal{B}$ and $m \in \mathcal{M}$.

For each MVNO $m \in \mathcal{M}$, the total number $N_m$ of linked RBs on the corresponding RAN slice under policy L is $$N_m = \frac{1}{2} \sum_{b \in \mathcal{B}} \sum_{b' \in \mathcal{B} \setminus \{b\}} y_{b,b'} \cdot n_{b,b',m}, \quad (3)$$

where the ½ factor is introduced to avoid double counting the same RBs.

The RSEP is formally defined as follows:

$$\underset{\pi \in \Pi}{\text{maximize}} \sum_{m \in \mathcal{M}} N_m \quad \text{(RSEP)}$$

Thus, an objective in Problem RSEP is to compute a feasible slicing enforcement policy $\pi$ that maximizes the total number of linked RBs while guaranteeing that the computed policy does not violate the feasibility constraint $\pi \in \Pi$. Moreover, as can be seen in FIG. 1, the formulation in Problem RSEP is well-suited for RAN slicing problems. This is because it satisfies MVNOs' requirements in terms of number of obtained RBs, helps orthogonality among slices through the reduction of inter-MVNO interference, and enables coordination-based communications such as CoMP, JT and beamforming.

III. ADDRESSING THE RSEP PROBLEM

To solve Problem RSEP, a slicing enforcement policy is computed by exploring the feasible set H. In the following, (i) Problem RSEP is reformulated by using the RB allocation indicators introduced in Section II; (ii) the problem is shown to be NP-hard; and (iii) a number of techniques are provided to address Problem RSEP.

A. Optimal Solution

By using the definition of the RB allocation indicator $x_{m,b,n,t}$ and from (1), (3) can be reformulated as $$N_m = \frac{1}{2} \sum_{t=1}^{T} \sum_{n=1}^{N_{RB}} \sum_{b \in \mathcal{B}} \sum_{b' \in \mathcal{B} \setminus \{b\}} y_{b,b'} x_{m,b,n,t} x_{m,b',n,t} \quad (4)$$

Consider the matrices $B = Y \otimes I_{N_{RB} \cdot T}$ and $Q = I_M \otimes B$, where $\otimes$ stands for Kronecker product and $I_k$ is the k×k identity matrix. From (4), it can be easily shown that $\sum_{m \in \mathcal{M}} N_m = \frac{1}{2} x^T Q x$. Accordingly, Problem RSEP can be reformulated as $$\underset{x}{\text{maximize}} \frac{1}{2} x^T Q x \quad \text{(RSEP-QP)}$$

$$\text{subject to} \sum_{t=1}^{T} \sum_{n=1}^{N_{RB}} x_{m,b,n,t} = L_{m,b}, \ \forall b \in \mathcal{B}, \ \forall m \in \mathcal{M} \quad (C1)$$

$$\sum_{m \in \mathcal{M}} x_{m,b,n,t} \leq 1, \ \forall (n,t) \in \mathcal{R}, \forall b \in \mathcal{B} \quad (C2)$$

$$x_{m,b,n,t} \in \{0,1\}, \ \forall (n,t) \in \mathcal{R}, \forall b \in \mathcal{B}, \forall m \in \mathcal{M} \quad (C3)$$

where $x = (x_{m,b,n,t})_{m,b,n,t}$ can be represented as a $MBN_{RB}T \times 1$ column array.

In Problem RSEP-QP, Constraint (C1) ensures that all MVNOs receive the assigned number of RBs, while Constraint (C2) guarantees that each RB is allocated to one MVNO only. Finally, Constraint (C3) expresses the boolean nature of the RB allocation indicator. Problems RSEP and RSEP-QP are equivalent, as the latter is a reformulation of the former in terms of the RB allocation indicator. However, this new formulation shows that the RSEP can be modeled as a 0-1 (or binary) Quadratic Programming (QP) problem. Theorem 1 proves that Problem RSEP-QP is NP-Hard.

Theorem 1. Problem RSEP-QP is NP-hard.

Proof: It is sufficient to show that the matrix Q is indefinite, i.e., it admits both positive and negative eigenvalues. Indeed, it is well-known that even real-valued non-binary QP problems are NP-hard when Q is indefinite.

From the definition of B and Y, matrix Q has all zero entries in the main diagonal. Accordingly, Q is a zero-diagonal (or hollow) symmetric matrix. Let $\lambda$ be the set of eigenvalues of Q. Notice that $\sum_{\lambda_i \in \lambda} \lambda_i = \text{Tr}\{Q\}$, and $\text{Tr}\{Q\} = 0$ in this case. Thus, all the eigenvalues of Q must sum up to zero, meaning that either all eigenvalues are equal to zero, or Q has both positive and negative eigenvalues. Thanks to the symmetry of Q, the former case can be excluded, since it would imply that Q is the zero-matrix (i.e., there is no interference among BSs and $y_{b,b'} = 0$ for all b, b' $\in \mathcal{B}$). Therefore, Q must have both positive and negative eigenvalues, i.e., Q is indefinite. This proves the theorem.

Since Problem RSEP-QP is NP-hard, in Section III-B, linear relaxation and the concept of equivalence are leveraged to provide a reduced-complexity solution to Problem RSEP-QP, while in Section III-C and D, heuristic techniques are provided that can compute a sub-optimal solution to Problem RSEP-QP with polynomial complexity.

B. Approximated Solution

Let $V = M \cdot B \cdot N_{RB} \cdot T$, and consider the following transformed version of Problem RSEP-QP:

$$\underset{x}{\text{maximize}} \frac{1}{2} x^T (Q + 2\lambda I_V) x - \lambda e^T x \quad \text{(RSEP-EQ)}$$

$$\text{subject to } (C1), (C2) 0 \leq x_{m,b,n,t} \leq 1, \quad (C4)$$
$$\forall (n,t) \in \mathcal{R}, \forall b \in \mathcal{B}, \forall m \in \mathcal{M}$$

where $\lambda \in \mathbb{R}$ is a real-valued parameter whose relevance to Problem RSEP-EQ is explained in Theorem 2, and $e^T = (1, 1, \ldots, 1)$. The following theorem holds.

Theorem 2. There exists $\lambda \in \mathbb{R}$ such that Problem RSEP-EQ is equivalent to Problem RSEP-QP. Also, let $z^*$ be the largest (positive) eigenvalue of Q. For any $\lambda \geq -z^*$, Problem RSEP-EQ is a quadratic convex problem over the unit hypercube.

Proof: Intuitively, the utility function in Problem RSEP-EQ introduces the term $kx^T(e-x)$ which generates a cost, or a penalty, proportional to $\lambda$ when constraint $x_{m,b,n,t} \in \{0,1\}$ is not satisfied. Accordingly, the binary constraint in Constraint (C3) can be dropped and relaxed with the unit hypercube constraint $0 \leq x_{m,b,n,t} \leq 1$. Notice that Q contains only 0-1 entries and $x_{m,b,n,t} \leq 1$, which implies that $x^T Q x$ is always bounded and finite. Also, $x^T Q x$ has continuous and bounded first-order derivatives over the unit hypercube, i.e., it is Lipschitz-continuous in any open set that contains the unit hypercube. From Giannessi and Tardella, Th. 3.1, it must exist $\lambda_0 \in \mathbb{R}$ such that $\forall \lambda \geq \lambda_0$ Problems RSEP-EQ and RSEP-QP are equivalent. (F. Giannessi and F. Tardella, *Connections between Nonlinear Programming and Discrete Optimization*. Springer US, 1999, pp. 149-188.) Theorem 1 provides that the Q matrix admits both negative and positive eigenvalues. Accordingly, let z be the set of eigenvalues of Q and $z^* = \max\{z_1, z_2, \ldots, z_{|z|}\}$. It is possible to show that if $\lambda \geq z^*$, then the matrix $Q + 2\lambda I_V$ is positive semi-definite. Thus, Problem RSEP-EQ is convex if $\lambda \geq z^*$, which proves the Theorem.

Remarks. Theorem 2 shows that it is possible to relax the binary constraint of Problem RSEP-QP with a penalty term. In general, local and global solutions of convex quadratic maximization problems (and the corresponding concave quadratic minimization problems) lie on the vertices of the feasibility set. Since the vertex space is considerably smaller than the complete feasibility set $\Pi$, Problem RSEP-EQ is easier to solve when compared to Problem RSEP-QP. Specifically, approaches such as cutting plane and extreme point ranking methods can be used to efficiently solve Problem RSEP-EQ.

C. First Heuristic Solution

Although Problem RSEP-EQ has lower complexity than Problem RSEP-QP, in the worst case it still requires exponential time with respect to the number of vertices. Therefore, a polynomial solution to Problem RSEP-QP can be provided by using a heuristic approach.

Given Problem RSEP-QP maximizes the number of shared RBs, as many linked RBs as possible can be allocated to those MVNOs that request the highest amount of RBs on multiple interfering BSs. Indeed, MVNOs that request the greatest number of resources on different interfering BSs are also expected to produce a high number of linked RBs. Accordingly, for each MVNO m the linking index $l_m$ is defined as $$l_m = \sum_{b \in \mathcal{B}} \sum_{b' \in \mathcal{B} \setminus \{b\}} \min\{L_{m,b}, L_{m,b'}\} y_{b,b'} \quad (5)$$

The linking index is used to sequentially allocate RBs to those MVNOs with the highest linking index. This procedure is termed the Most Linked First (MLF) procedure, which can be implemented by, for example, Algorithm 1 (below) and works as follows:

1) generate set $\mathcal{M}^G = \mathcal{M}$ for all m, $k \in \mathcal{M}^G$ s.t. m<k, then $l_m \geq l_k$;
2) start allocating RBs on all BSs in sequential order to the first MVNO in $M^G$, i.e., the MVNO whose linking index $l_m$ is the highest among all MVNOs in $\mathcal{M}$. When all RBs are allocated to the considered MVNO, say m', remove it from $\mathcal{M}^G$ and set $l_{m'}=0$;
3) if $\mathcal{M}^G = \emptyset$, stop. Otherwise, re-execute Step 2 until all MVNOs are assigned to the required RBs.

Line 4 requires to compute (5) which has complexity $\mathcal{O}(MB^2)$, while Line 5 has complexity $\mathcal{O}(M \log M)$. The while loop at Line 6 has complexity $\mathcal{O}(N_{RB}BM)$. Thus, the complexity of MLF is $\mathcal{O}(C)$, where C=max$\{MB^2, M \log M, N_{RB} \cdot B \cdot M\}$.

| Algorithm 1 RSEP-MLF |
|---|
| 1: Input B; M; Y; L; |
| 2: Output A MLF RBs allocation $x^G = (x_{m,b,n,t}^G)_{m,b,n,t}$; |
| 3: Set $x_{m,b,n,t}^G = 0$ for all m ∈ M, b ∈ B, (n, t) ∈ R; |
| 4: Compute the linking index $l = (l_m)_{m \in M}$; |
| 5: $M^G \leftarrow$ Sort M by $l_m$ in decreasing order; |
| 6: while $M^G \neq \emptyset$ do |
| 7:    for each BS b ∈ B do |
| 8:       Update $x_{m,b,n,t}^G$ by allocating $L_{M^G(1),b}$ subsequent RBs to MVNO m on BS b; |
| 9:    end for |
| 10:    $M^G \leftarrow M^G \setminus \{M^G(1)\}$; |
| 11: end while |

D. Second Heuristic Solution

The greedy algorithm for RSEP-MLF enjoys fast convergence time at the price of sub-optimal performance. Thus, an additional RAN slicing enforcement heuristic technique is provided that reduces the gap between RSEP-QP and RSEP-MLF while keeping the computational complexity as low as possible. To this end, a technique termed RSEP-IMLF is provided, which improves upon RSEP-MLF by iteratively adjusting the RB allocation strategy such that the number of linked RBs is increased.

First, note that the RSEP is shift-invariant with respect to the indexing of the RB (n) and temporal slot (t). This is because, for any given solution x*, the solution x with $=x_{m,r,1,t} = x_{m,r,N_{RB},t}^*$ and $x_{m,r,N_{RB},t} = x_{m,r,1,t}^*$ for all m, r, and t is clearly still equivalent to x* as it produces the same number of linked RBs as x*. In general, this result can be extended to any reshape procedure that maintains the cardinality of $\mathcal{R}$ equal to $N_{RB} \cdot T$. This is shown in FIG. 4, where the original RB grid (left) contains $N_{RB} \cdot T=12$ RBs and has 6 linked RBs. FIG. 4 shows that by reshaping the resource grid into a row vector does not change the amount of linked RBs.

Figure 5:
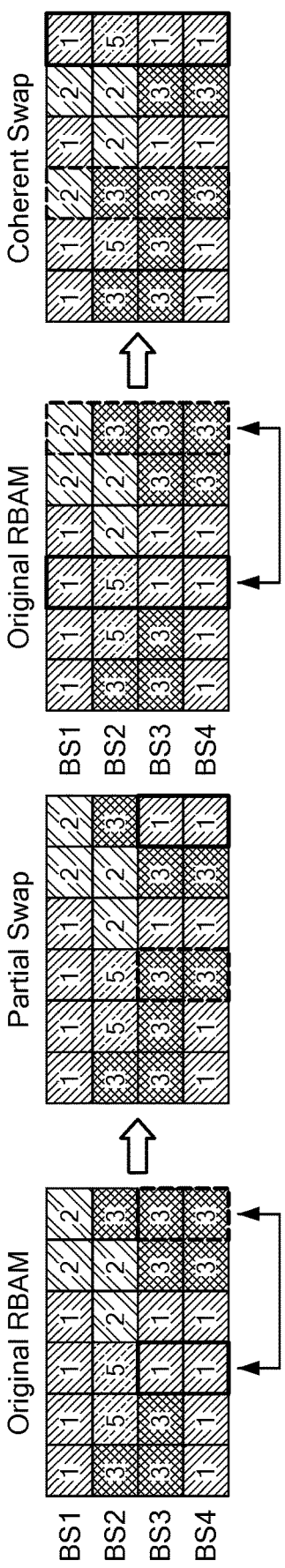
FIG. 5 is a schematic illustrative example of a RB allocation matrix (RBAM) and swapping procedures with B=4 BSs and M=5 MVNOs.

Additionally, note the concept of RB allocation matrix (RBAM). Consider the reshaped RB grid $\mathcal{R} \in \mathbb{R}^{N_{RB}T \times 1}$, the RBAM is represented by the matrix $\sigma = (\sigma_b)_{b \in \mathcal{B}}$ where $\sigma_b(x^*) = (\sigma_{b,\tau})_{\tau \in \mathcal{R}} : \mathcal{X} \to \mathcal{R}$. Henceforth, b and τ represent rows and columns of α respectively. For any slicing enforcement solution $x \in \mathcal{X}$, the RBAM builds a map between each RB in $\mathcal{R}$ and the MVNO that has been assigned with that RB on BS b. Let $M_{b,\tau}(x^*)$ be the MVNO that RB τ has been assigned to, i.e., the MVNO m such that $x_{m,b,r}=1$. Accordingly, set $\sigma_{b,\tau} = M_{b,\tau}(x^*)$. An example of a possible RBAM with B=4 BSs and M=5 MVNOs is shown in FIG. 5.

The concept of swapping can now be introduced. Specifically, two columns $\tau_1$ and $\tau_2$ of the RBAM are coherently swapped when all their corresponding entries $\sigma_{b,\tau_1}$ are replaced with those of $\sigma_{b,\tau_2}$ and vice versa. On the contrary, two columns are partially swapped when only a portion of entries is replaced among two columns. An example of a coherent swap is shown in the right side of FIG. 5, where the third and fifth columns are swapped. The left side shows a partial swap where only the two rows at the bottom of the RBAM are swapped.

By leveraging the concepts of reshaping, RBAM and swapping, an improved version of RSEP-MLF can be provided, which works as follows:

1) Compute a slicing enforcement solution $x \in \mathcal{X}$ via RSEP-MLF and derive the corresponding RBAM α. Define $\mathcal{B}^* = B$.
2) Select the row $b_0 \in \mathcal{B}^*$ in σ with the smallest number of distinct MVNOs and remove it from $\mathcal{B}^*$, i.e., $\mathcal{B}^* = \mathcal{B}^* \setminus \{b_0\}$.
3) Pick the row $b^* \in \mathcal{B}^*$ that shares the highest number of linked RBs with $b_0$.
4) Select at random two columns $\tau_1$ and $\tau_2$. Perform a single-row partial swap on the RBAM α by swapping the two elements $(b_0, \tau_1)$ and $(b_0, \tau_2)$. If the partial swap has improved the number of linked RBs, update the RBAM accordingly. This step is repeated at most $I_S$ times.
5) If $\mathcal{B}^* = \emptyset$, stop. Otherwise, re-execute Step 2.

The rationale behind RSEP-IMLF is to compute a sub-optimal solution quickly, and then iteratively try to increment the total number of linked RBs by testing a limited amount of swapping combinations. The complexity of Step 1 is $\mathcal{O}(C)$, where C=max$\{MB^2, M \log M, N_{RB} \cdot B \cdot M\}$. Step 2 is executed once, and its complexity is $\mathcal{O}(B)$, while the complexity of Step 3 is $\mathcal{O}(BI_S)$. Accordingly, the overall complexity of RSEP-IMLF is $\mathcal{O}(C+B+BI_S) = \mathcal{O}(C+BI_S)$.

One example algorithm for RSEP-IMLF is as follows:

```
Algorithm 2 RSEP-IMLF

1:   Input B; M; Y; L;
2:   Output A RBs allocation x^G = (x_{m,b,n,t}^G)_{m,b,n,t};
3:   Set B* ← B;
4:   x* ← A MLF RB allocation computed through Algorithm 1;
5:   σ ← The RBAM for x*;
6:   b_0 ← The row of σ with the smallest number of distinct
     MVNOs;
7:   while |B*| ≠ 0 do
8:       b* ← The row that shares the highest number of
             linked RBs with b_0;
9:       while i ≤ I_S do
10:          (τ1, τ2) ← Selects two columns at random;
11:          σ* ← A copy of σ with elements (b_0, τ1) and (b_0, τ2)
                  swapped;
12:          if number of linked RBs has improved then
13:              σ ← σ*;
14:          end if
15:          i ← i + 1;
16:      end while
17:      B* ← B* \ {b_0};
18:  end while
```

E. Speeding-Up the Execution of RSEP-$\mathcal{Q}$P and RSEP-E$\mathcal{Q}$

Although Problems RSEP-QP and RSEP-EQ have exponential complexity, their complexity can be reduced by leveraging specific structural properties of the RSEP.

1) Sparsity: Let $x^{OPT}$ be an optimal solution to either Problem RSEP-QP or RSEP-EQ. If $L_{m,b}=0$ for a given MVNO m on BS b, then $x_{m,b,n,t}^{OPT}=0$ for all n and t. Furthermore, notice that the complexity of many optimization problems strongly depends on the number of non-zero entries (i.e., the sparsity) of the Q matrix. Thus the complexity of the two problems can be reduced by inducing sparsity through two transformations. Specifically, let m' and b' such that $L_{m',b'}=0$, for both RSEP-QP and RSEP-EQ generate a reduced matrix $\tilde{Q}$ where $Q_{m',b',n,t}=0$ for all $(n, t) \in \mathcal{R}$. For RSEP-QP, it suffices to replace the Q matrix with $\tilde{Q}$. To keep the equivalence between RSEP-QP and RSEP-EQ, the objective function of RSEP-EQ can be reformulated as $$\frac{1}{2}x^T(\tilde{Q}+2\lambda\tilde{I}_V)x-\lambda \quad (6)$$

where $\tilde{I}_V$ is the identity matrix where those entries corresponding to the 2-tuple (m', b') are set to zero.

Note that the two above transformations generate equivalent problems to RSEP-QP and RSEP-EQ and do not impact the optimality of the computed solutions. In fact, Constraint (C1) requires $$\sum_{t=1}^{T}\sum_{n=1}^{N_{RB}} x_{m',b',n,t}=0$$

when $L_{m',b'}=0$. Since $x_{m',b',n,t} \in \{0, 1\}$, then $x_{m',b',n,t}=0$ for all n and t associated to the 2-tuple (m', b'). That is, at the optimal solution, $x_{m',b',n,t}=0$ independently of the value of $q_{m',b',n,t}$.

2) RB Aggregation: Let K=GCD(L) be the greatest common divisor (GCD) among all of the elements in the L matrix. It is shown that Problems RSEP-QP and RSEP-EQ are equivalent to solve the same problems with a scaled RB grid, when given conditions on K, T and $N_{RB}$ are satisfied. Specifically, if K>1 and either the number $N_{RB}$ of RBs or the number T of time slots are proportional to K, the available RBs can be aggregated in groups of K RBs so that each group can be seen as a single aggregated RB. Such a property is referred to as aggregability of the RSEP. Definition follows below.

Definition 2 (Aggregable RSEP). The RSEP is said to be aggregable if $N_{RB}$ (mod K)=0 or T (mod K)=0, where K=GCD(L)>1 and A (mod B) is the A modulo B operator.

In the first case, the number of RBs is scaled as $\tilde{N}_{RB}=N_{RB}/K$. In the second case, the number of time slots is scaled as $\tilde{T}=T/K$. That is, for each BS $b \in \mathcal{B}$, the set $\mathcal{R}_b$ of available RBs at b is replaced with an aggregated version of cardinality $|\tilde{\mathcal{R}}_b|=N_{RB}T/K$ where K RBs are grouped together to create a single RB. This low-dimensional RSEP is referred to as the aggregated RSEP.

Theorem 3. Let the RSEP be aggregable; it is possible to compute an optimal solution to the RSEP by solving the aggregated RSEP.

Proof: Let $Z=N_{RB}T$, K>1 be the GCD of L, P be the original RSEP problem and $\tilde{P}$ be the aggregated RSEP with $\tilde{T}=T/K$. The proof for the case where it is aggregated with respect to $N_{RB}=N_{RB}/K$ follows the same steps. As noted above, problem P is shift invariant with respect to the indexing of n and t. With this feature at hand, it can be shown that the cardinality of $\mathcal{R}$ can be reduced by a factor K and still achieve equivalence and optimality.

Let $\chi \in \mathbb{R}^{N_{RB}\tilde{T} \times K}$ and $\tilde{X} \in \mathbb{R}^{N_{RB}\tilde{T} \times 1}$ be the feasibility sets of P and $\tilde{P}$ in the RBAM space, respectively. Also, let $f_Z(x): \mathcal{X} \to \mathbb{N}$ and $f_{Z/K}(x): X \to \mathbb{N}$ be the objective functions of problem P and $\tilde{P}$, respectively. The optimal solution to P is denoted as $x^* \in \mathcal{X}$, while the optimal solution to $\tilde{P}$ is denoted as $\tilde{x}^* \in \tilde{X}$. Due to the optimality of $x^*$ and $\tilde{x}^*$, then $f_Z(x^*) \geq f_Z(x)$ for all $x \in \mathcal{X}$, and $f_{Z/K}(\tilde{x}^*) \geq f_{Z/K}(\tilde{x})$ for all $\tilde{x} \in \tilde{\mathcal{X}}$. Let $\tilde{x}_A \in \mathcal{X}$ be the solution to P generated by expanding the aggregated optimal solution $\tilde{x}^*$ to $\tilde{P}$. Let $\mathcal{R} \in \mathbb{R}^{N_{RB}\tilde{T} \times K}$, the expanded solution $\tilde{x}_A^* =$ $$\left(\tilde{x}_{A_{m,b,\tau,k}}^*\right)_{m,b,\tau,k}$$

is generated by setting $$\tilde{x}_{A_{m,b,\tau,k}}^* = \tilde{x}_{m,b,\tau}^*$$

for all k=1, ..., K, $m \in \mathcal{M}$ and $b \in \mathcal{B}$. Intuitively, the matrix $\tilde{x}^*$ is replicated by adding K−1 rows whose entries are identical to those in $\tilde{x}^*$.

It can now be proven that P and $\tilde{P}$ are equivalent by contradiction. Accordingly, the hypothesis is negated and it is assumed that the two problems are not equivalent, i.e, $f_Z(x^*) > f_Z(\tilde{x}_A^*)$.

Let $g(x): \mathcal{X} > \mathbb{N}$ be defined as $g(x)=K^{-1}f(x)$. Intuitively, if the objective function $f(x)$ of P is replaced with $g(x)$, the same problem is obtained where each linked RB gives a reward equal to $K^{-1}$ ($f(x)$ instead provides a unitary reward for each linked RB). By construction of $\tilde{x}_A^*$, then $f_{Z/K}(\tilde{x}^*)=K^{-1}f_Z(\tilde{x}_A^*)=g(\tilde{x}_A^*)$. From the assumption $f_Z(x^*)>f_Z(\tilde{x}_A^*)$, then $$g(x^*)=K^{-1}f_Z(x^*)>K^{-1}f_Z(\tilde{x}_A^*)g(\tilde{x}_A^*)=f_{Z/K}(\tilde{x}_A^*) \quad (7)$$

which states that $g(x^*)>f_{Z/K}(\tilde{x}^*)$.

To show that this last statement is a contradiction to the hypothesis (i.e., $\tilde{x}^*$ is optimal for $\tilde{P}$), it must be shown that there always exists a mapping that transforms any solution in $\mathcal{X}$ to an equivalent solution in $\tilde{\mathcal{X}}$. That is, it is necessary to find a function h(x): $\mathcal{X} \to \tilde{\mathcal{X}}$ (such that h(x)=x̂∈$\tilde{\mathcal{X}}$ that can be transformed into $\hat{x}_A$ such that $f_{Z/K}(\hat{x})=K^{-1}f_Z(\hat{x}_A)$).

In general, such a mapping is not unique, since any optimal solution in $\mathcal{X}$ and $\tilde{\mathcal{X}}$ is shift invariant. However, in Section F below, an easy mapping h(x)=x̃ is presented that, starting from an optimal solution x∈$\mathcal{X}$, always generates an equivalent optimal solution x̃∈$\tilde{\mathcal{X}}$ such that $f_{Z/K}$(x̃)=$K^{-1}f_z$(x).

The existence of this mapping implies that $x_R^*$=h(x*) satisfies $f_{Z/K}(x_R^*)=K^{-1}f_Z(x^*)$=g(x*), which is clearly a contradiction. In fact, from (7), $f_{Z/K}(x_R^*)$=g(x*)>$f_{Z/K}$(x̃*), which implies the existence of a solution $x_R^*$ that contradicts the optimality of x̃* over X̃. It follows that $f_{Z/K}$(x̃*)=$K^{-1}f_Z$(x*) must hold. Hence, any solution x̃* to the aggregated RSEP can be expanded to obtain $\tilde{x}_A^*$ that is optimal for the original RSEP. This concludes the proof.

F. Aggregation map from $\mathcal{X}$ to $\tilde{\mathcal{X}}$

Consider the reshaped RB grid $\mathcal{R} \in \mathbb{R}^{N_{RB}T \times 1}$, and define the RB allocation matrix (RBAM)=σ= $(\sigma_b)_{b \in \mathcal{B}}$ where $\sigma_b$(x*)=$(\sigma_{b,\tau})_{\tau \in \mathcal{R}}$: $\mathcal{X} \to \mathcal{R}$ Henceforth, b and τ will represent rows and columns of σ, respectively. For any given optimal solution x∈$\mathcal{X}$ a map is built between each RB in $\mathcal{R}$ and the MVNO that has been assigned with that RB on BS b. Let $M_{b,\tau}$(x*) be the MVNO that RB τ has been assigned to, i.e., the MVNO m such that $x_{m,b,\tau}$=1. Accordingly, $\sigma_{b,\tau}$=$M_{b,\tau}$(x*).

Figure 6:
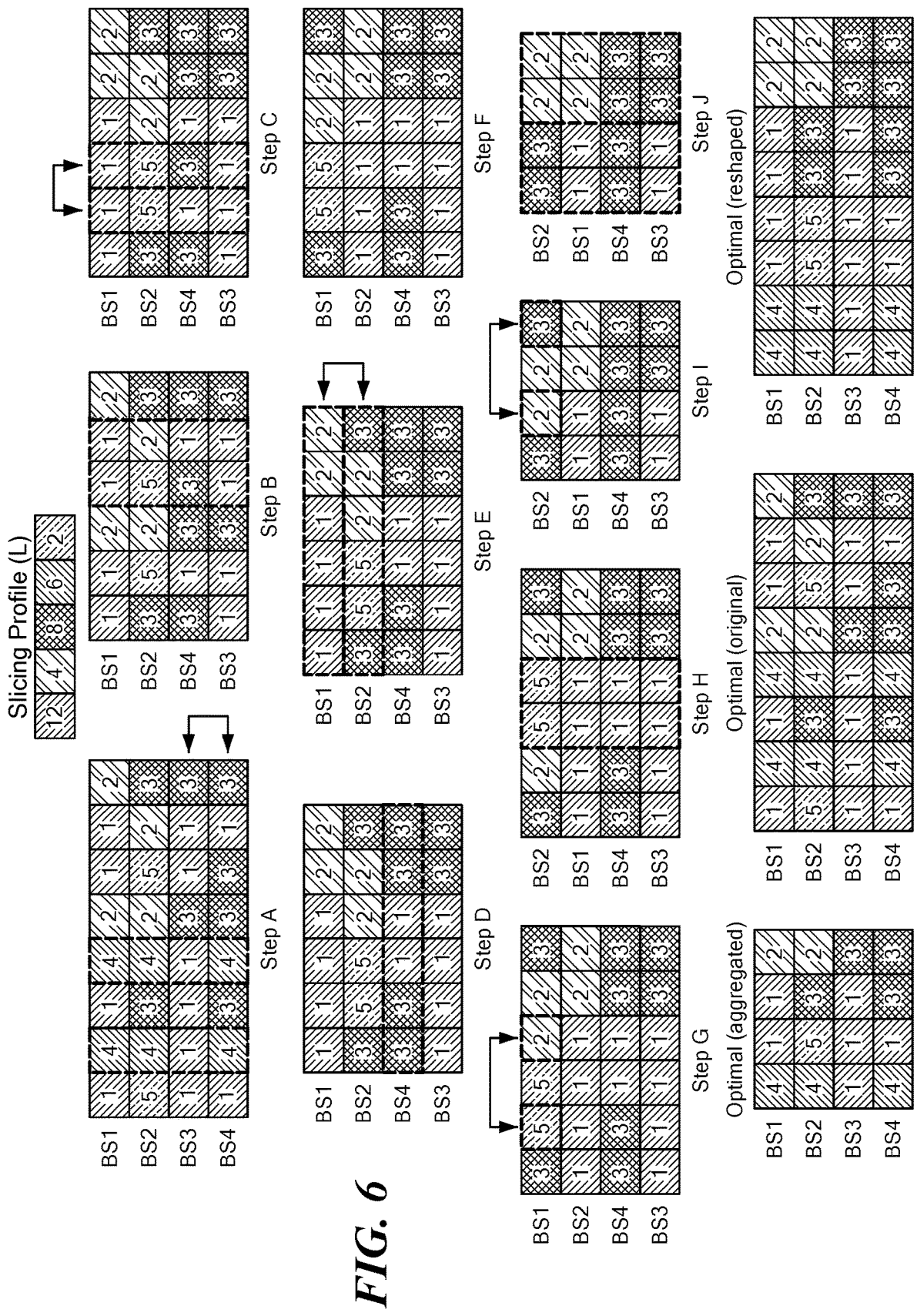
FIG. 6 is a schematic example of a reshaping algorithm.

FIG. 6 depicts an example that helps explain how to map any optimal solution x*∈$\mathcal{X}$ to the RSEP to an aggregated solution x̃*∈$\tilde{\mathcal{X}}$. Represent in Step A the RBAM corresponding to the optimal solution of the RSEP when R=4 interfering BSs are deployed and M=5 tenants request a different amount of RBs on each BS. Consider also $N_{RB}$=2 and T=4. Consider the slicing profile in FIG. 6 where GCD is K=2. Recall that two columns $\tau_1$ and $\tau_2$ are said to be coherently swapped when all their corresponding entries $\sigma_{b,\tau_1}$ are replaced with those of $\sigma_{b,\tau_2}$ and vice versa for all b∈ $\mathcal{B}$ Two columns are partially swapped when only a portion $\hat{\mathcal{B}} \subset \mathcal{B}$ of entries is replaced among two columns. Two entries $\sigma_{b_1,\tau}$ and $\sigma_{b_2,\tau}$ are linked if $M_{b_1,\tau}(x)=M_{b_2,\tau}(x)$ and $y_{b_1,b_2}$=1. Finally, K adjacent entries $$\sigma_{b,\tau_1}, \ldots, \sigma_{b,\tau_K}$$

are said to be paired if $$M_{b,\tau_1}(x) = M_{b,\tau_2}(x) = \ldots = M_{b,\tau_M}(x);$$

are said to be unpaired otherwise.

The mapping technique works as follows. First, if any K columns of σ are identical, (see Step A, where the two columns 2 and 4 are identical), remove them from σ (see Step B) and add them to the aggregated RBAM (see the first column in the bottom-left RBAM). Then, the following steps are taken:

1) Select the row $b_0$ of σ with the smallest number of distinct MVNOs and move it to the lowest row (see Steps A and B where rows 3 and 4 are swapped).
2) Update σ by ordering row $b_0$ in MVNO identifier order (see Step B, where to order row $b_0$, column is coherently swapped with column 5, and then column 4 is swapped with column 5). This operation (i) creates ordered groups of K entries (see Step C), and (ii) preserves the optimality of the solution as all columns are coherently swapped.
3) If all entries in the RBAM have been paired, stop.
4) If any K columns of σ are identical, remove them from σ (as done in Steps H and J) and include them to the aggregated RBAM (see bottom left RBAM).
5) Select the row $b_n$ (among the rows above $b_0$) that shares the highest number of links with $b_0$ (row 3 in Step D and row 1 in Step E), and move it above $b_0$ (row 3 in Step D is already above $b_0$, while in Step D rows 1 and 2 need to be swapped).
6) If all the entries in $b_n$ are paired, go to 7 (such as in Steps D and F); otherwise, find K unpaired entries and generate a partial swap of $b_n$ and the upper rows such that i) the number of links remains the same (note that the initial unpaired solution is optimal, and any partial swap produces a number of links that is at most as high as that of the initial solution); and ii) the K entries are paired. Since the number of links are forced to be the same, any partial swap generated in this step maintains the optimality of the solution. Although the partial swap might change the number of links per tenant, it does not change the total number of links. Thus, the solution generated by the partial swap and the initial optimal solution are equivalent and share the same number of links.
7) Set $b_0$=$b_n$ and go to 3).

Upon termination, the technique creates an aggregated RBAM (bottom-left RBAM) that is then transformed into a reshaped one (bottom-right RBAM) by replicating its columns exactly K−1 times. As shown in FIG. 6, all the entries in the reshaped RBAM σ are paired and the total number of links is equal to the original optimal RBAM (bottom-center RBAM). It is easy to note that both RBAMs generate the same number of links, i.e., the aggregation mapping generates an aggregated RBAM that is optimal for the RSEP. In fact, both the original and the reshaped RBAMs have 20 links.

The methods and systems described herein can be implemented by and/or as part of a computing system for controlling and operating a radio access network, for example, by an infrastructure provider. The computing system can be implemented as or can include a computer device that includes a combination of hardware, software, and firmware that allows the computing device to run an applications layer or otherwise perform various processing tasks. Computing devices can include without limitation personal computers, work stations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like and combinations thereof. A frequency unit can be any suitable frequency range, band, or division, for example, as determined by a modulation scheme.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit boards, or whether distributed over separated circuitry, housings, or circuit boards, and can include a transmitter-receiver.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a services (DaaS), backend as a service (BaaS), test environment as a service (TEaaS), API as a service (APIaaS), and integration platform as a service (IPaaS).

IV. EXAMPLES

A. Numerical Analysis

The performance of the methods and systems described in Section III has been assessed. To this end, an LTE frequency division duplexing (FDD) system was simulated with 1.4 MHz channel bandwidth, which was divided into 72 subcarriers organized into $N_{RB}=6$ physical resource blocks (PRBs). Each PRB represented the minimum scheduling unit and included 12 subcarriers and 14 symbols. Time was divided into discrete time slots called sub-frames, the duration of each sub-frame equaling the duration of one PRB and $N_{SF}=10$ sub-frames constituting a frame. $N_F \in \mathbb{N}$ was the number of frames within the slicing enforcing window. It followed that $T = N_F \cdot N_{SF}$.

In order to evaluate the benefits of the technology described herein, the several methods were compared with traditional methods that do not leverage information on network topology and interference to instantiate RAN slices, referred to as the "w/o isolation" case.

Unless stated otherwise, it was assumed that both the interference matrix Y and the slicing profile matrix L were generated at random at each simulation run. Results were averaged over 1000 independent simulation runs.

1. Convergence Time Analysis

Figure 7:
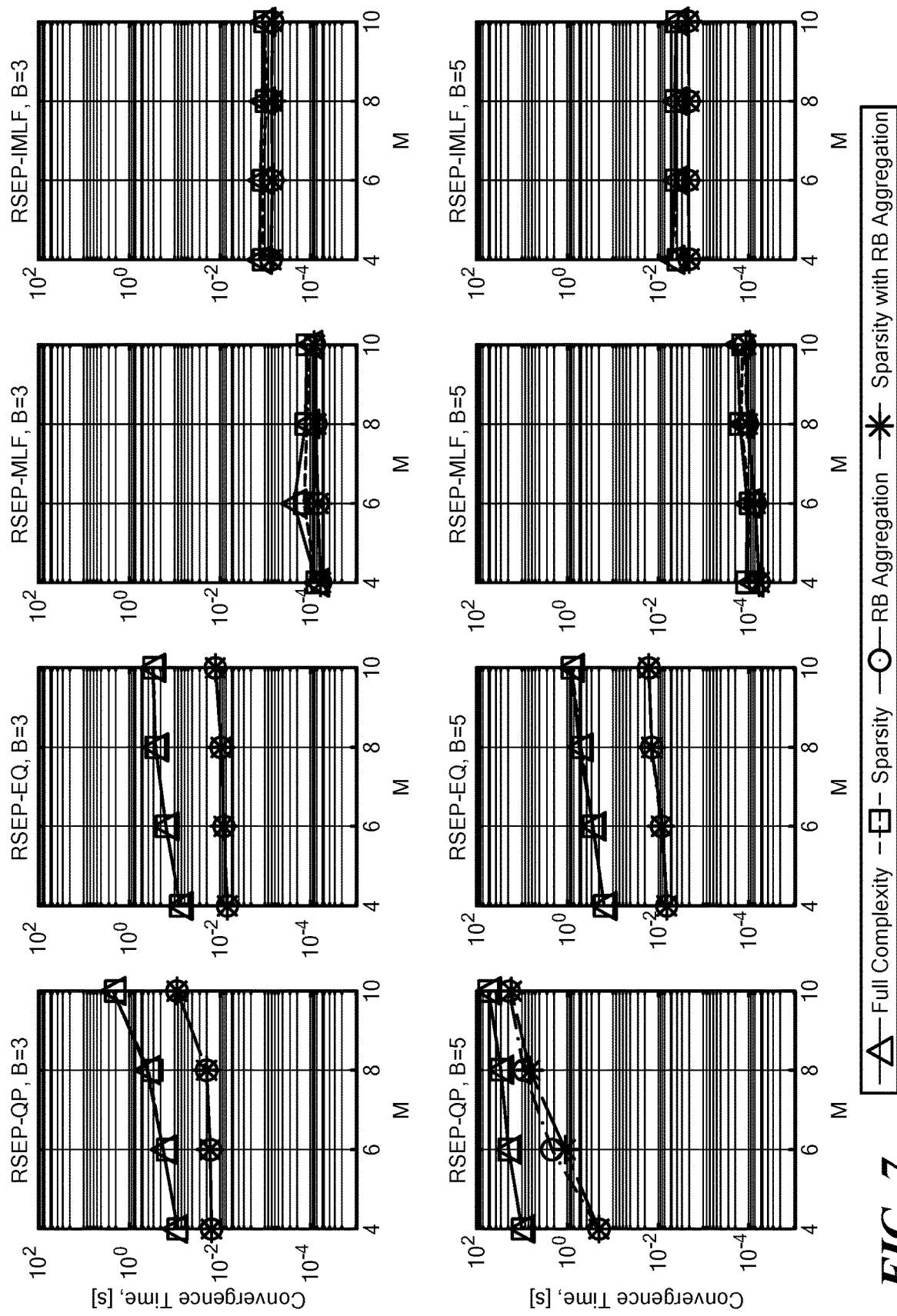
FIG. 7 illustrates graphs of convergence time (s) of three solutions as a function of M considering different computational time reduction techniques.

FIG. 7 shows the convergence time of the four techniques, RSEP-QP, RSEP-EQ, RSEP-MLF, and RSEP-IMLF, as a function of the number M of MVNOs when $N_F=2$. As expected, the technique with the slowest convergence time was the optimal technique RSEP-QP, while the fastest technique was RSEP-MLF. The convergence time of both RSEP-QP and RSEP-EQ increased as the number of MVNOs in the network increased, a behavior that was not exhibited by the two heuristic techniques RSEP-MLF and RSEP-IMLF, whose convergence time only slightly increased as a function of M.

FIG. 7 also shows the impact of the sparsity and RB aggregation techniques in Sections III-E1 and III-E2 on the overall convergence time. As can be observed, these techniques were effectively able to reduce the computation time of the other four techniques. Moreover, it was shown that the RB aggregation produced the best performance improvement in terms of convergence time.

It can be pointed out that RSEP-QP required approximately 100 s to compute an optimal solution when M=10 and B=5, and RSEP-EQ only required 1 s. On the contrary, RSEP-IMLF computed a solution within a few milliseconds, while RSEP-MLF computed the solution in less than a millisecond.

Figure 8:
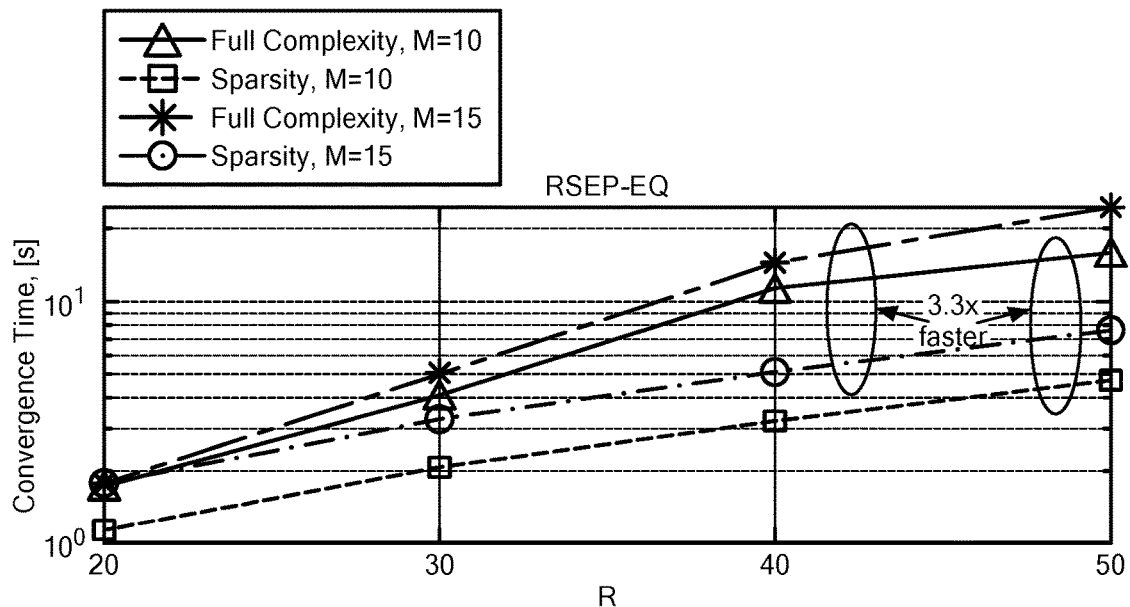
FIG. 8 is a graph of convergence time (s) of RSEP-EQ as a function of B considering different number M of MVNOs.

Interestingly, FIG. 7 reveals that the reduction in terms of convergence time brought by sparsity cannot be appreciated in small-scale scenarios. For this reason, the impact of sparsity in large-scale networks was investigated and the obtained results are presented in FIG. 8. It was shown that sparsity effectively reduced the computation time by several tens of seconds, and the gain increased as both M and B increased. From FIG. 8, it can be concluded that sparsity is a complexity reduction technique that best performs in large scale network deployments.

2. Optimality-Gap Analysis

Figure 9:
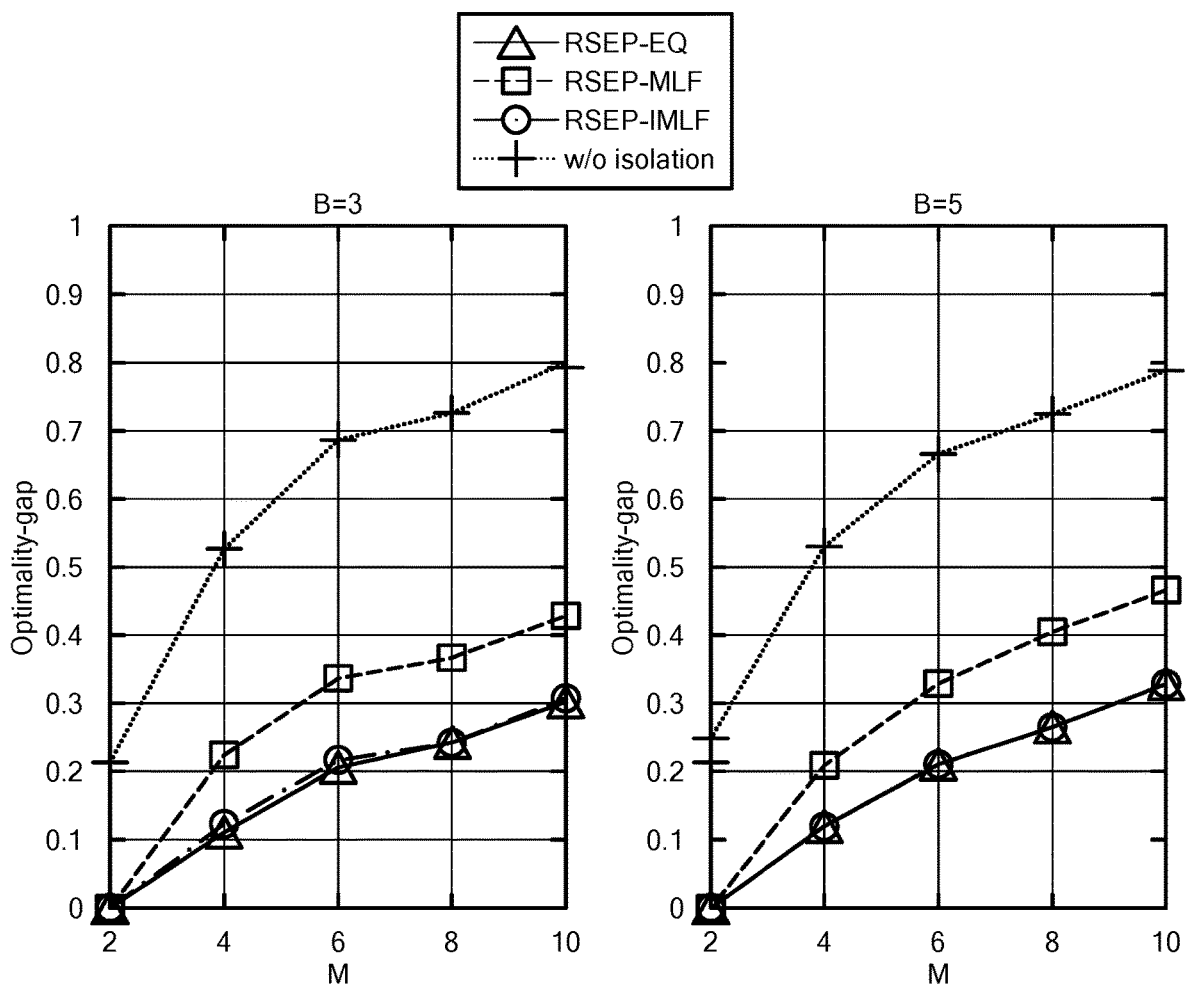
FIG. 9 illustrates graphs of optimality-gap of RSEP-EQ, RSEP-MLF, and RSEP-IMLF as a function of M considering different number B of BSs.

Another aspect is the optimality-gap between the optimal solution determined by RSEP-QP and those determined through the RSEP-EQ/RSEP-MLF techniques. Although Theorem 2 shows that, under some conditions, Problem RSEP-EQ is equivalent to Problem RSEP-QP, it cannot be guaranteed that the solution computed by RSEP-EQ is a global optimum. Indeed, the solver might get stuck in one of the local maximizers, thus effectively preventing the computation of an actual global maximizer. Thus, as shown in FIG. 9, the optimality-gap of RSEP-EQ and RSEP-MLF, RSEP-IMLF with respect to an optimal solution computed by RSEP-QP was investigated. The closer the optimality-gap was to zero, the closer the solutions computed by approximation and heuristic techniques were to optimality.

FIG. 9 shows that the optimality-gap increased as the number of MVNOs and BSs in the network increased. This is because the feasibility set increased as M and/or B increased. Given that local maximizers of RSEP-EQ lie on the vertices of the feasibility set, greater values of M and B produced a greater number of local maximizers; thus the probability of getting stuck in a local maximizer increased as well. Notice that although RSEP-MLF was negligibly affected by the number of BSs B, it achieved poor performance if compared to RSEP-EQ. It is notable that RSEP-IMLF is perhaps the most efficient technique which effectively trades off between optimality and computational complexity. FIGS. 9 and 7 also show that RSEP-IMLF can compute RAN slice enforcement strategies that achieve the same performance as RSEP-EQ on the order of a few milliseconds.

3. Linked RBs and SINR Analysis

Figure 10:
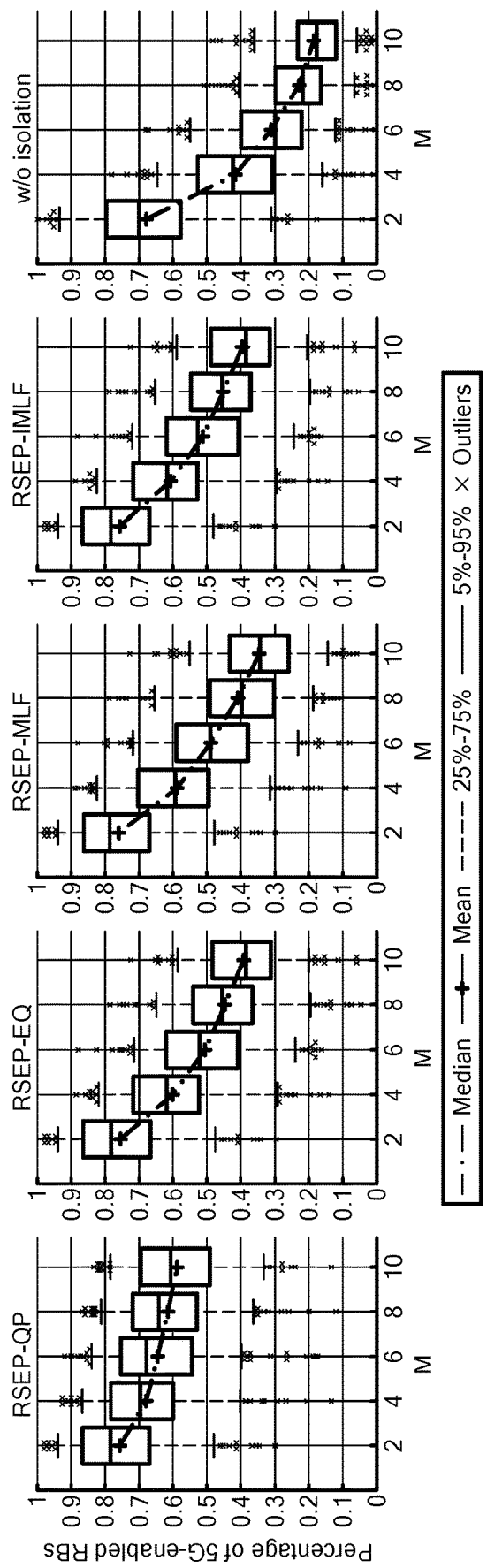
FIG. 10 illustrates graphs of percentage of linked RBs as a function of M and different RAN slicing enforcement policies (B=5).
Figure 11:
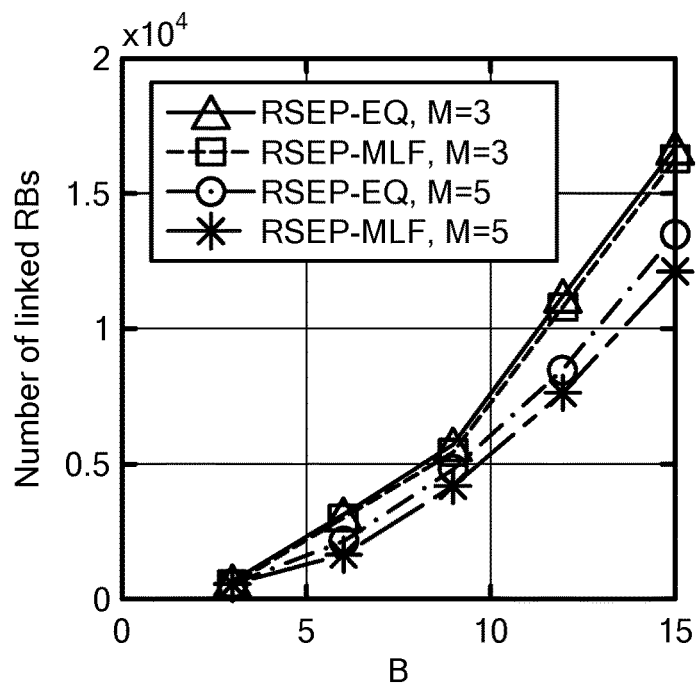
FIG. 11 is a graph of total number of linked RBs for RSEP-EQ and RSEP-MLF as a function of B for different values of M.

FIG. 10 shows the impact of M on the percentage of linked RBs of the system when $N_F=10$, B=5, and T=100. FIG. 11 shows the impact of M and B on the total number of linked RBs of the system when $N_F=10$ and T=100. As expected, RSEP-EQ and RSEP-IMLG always performed better than RSEP-MLF in terms of number of linked RBs. FIG. 11 illustrates that larger values of B produced a greater number of linked RBs. FIG. 10 illustrates that the number of linked RBs decreased as the number M of MNVOs increased. This is because, when more MVNOs included the same BS to their slices, it was harder to guarantee that all MVNOs received the corresponding amount of RBs joint with a large number of linked RBs.

As demonstrated in FIG. 10, and if compared to the traditional approach where inter-slice isolation was not enforced, the approach described herein increased the percentage of RBs that can be used to perform coordination-based transmissions. A further question is whether or not the enforcement strategies presented herein can actually bring performance gains in terms of throughput and interference mitigation when applied to real-world 5G networks. To answer this question, at each simulation run a random network topology was generated with B BSs and M independent user sets each having 10 mobile users randomly deployed within the simulated area. In other words, it was assumed that each MVNO served 10 mobile users, and it requested a RAN slice to serve them. Channel gain coefficients between BSs and mobile users were computed through the free-space path loss model.

Recall that the slicing profile L was randomly generated at each simulation run. For each L, RBs were allocated to MVNOs by running different RAN slicing enforcement algorithms. Then, for each MVNO the optimal downlink transmission policy was computed by determining (i) which user should be scheduled in each RB, (ii) how much power to allocate to each transmission, and (iii) whether or not a user should be served by multiple neighboring BSs through CoMP transmissions.

Figure 12:
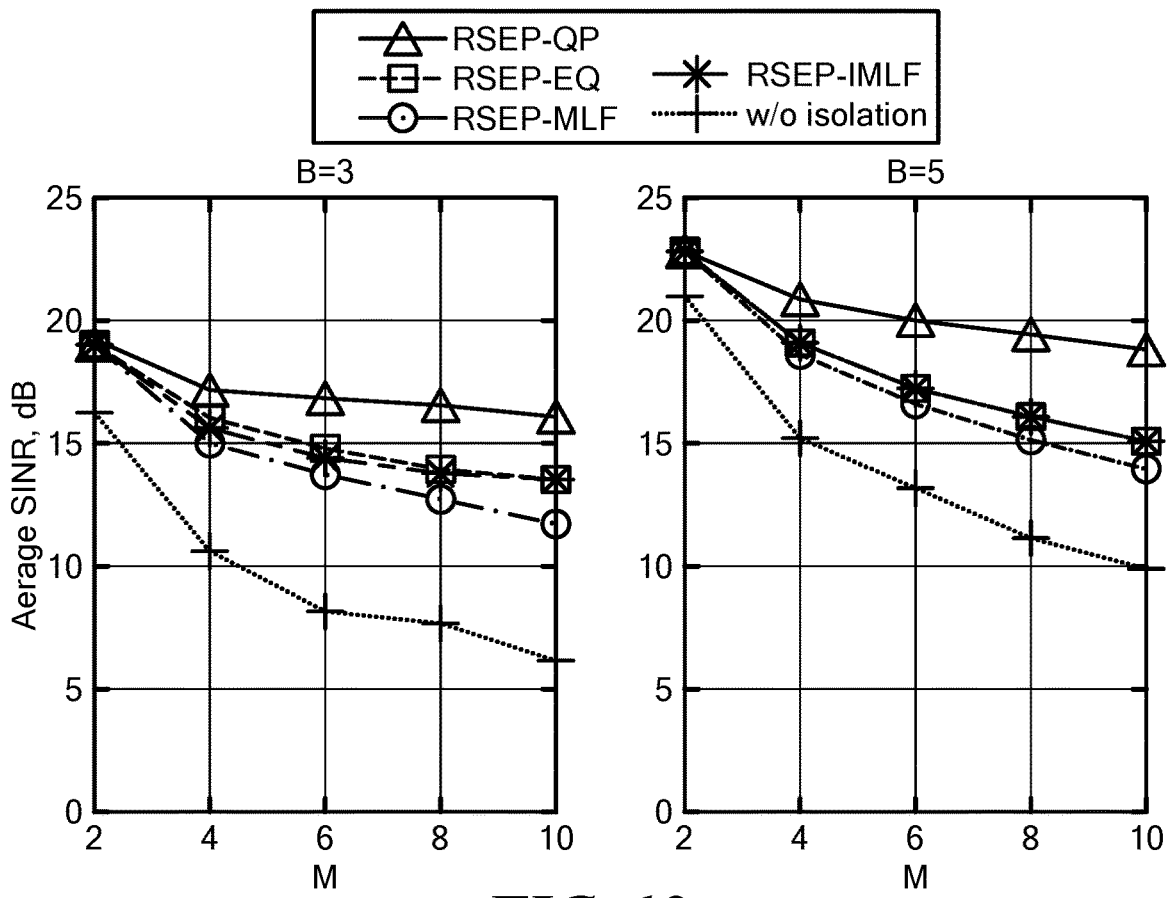
FIG. 12 illustrates graphs of average SINR achieved by the techniques as a function of M considering different number B of BSs.

The results are provided in FIG. 12, which shows the average SINR for different RAN slicing enforcement algorithms as a function of the number of MVNOs and BSs. In general, FIG. 12 shows that the approach described herein always improved the SINR of mobile users by providing gains up to 2 times and an effective SINR gain up to 10 dB. Despite the approximation ratio decreases when large values of B and M were considered, FIG. 12 shows that mobile users still experienced higher SINR values if compared to traditional RAN slicing algorithms where isolation across slices was not enforced. These results show the effectiveness of the approach described herein even in the case of sub-optimal RAN slice enforcement policies.

B. Experimental Analysis

To further investigate the issue of severe inter-MVNO interference, a series of experiments was run on testbeds, discussed in detail further below.

Example 1

1. Experimental Testbed and Network Scenarios

To evaluate the performance of the algorithms, an orthogonal frequency division multiple access (OFDMA) system as in LTE was used. In OFDMA, time and frequency were divided into RBs, where each RB had a time duration equal to the duration of an OFDMA frame, which spanned K subcarriers split into ΔT slots. Each of these slots was assigned to one MVNO according to the outcome of the slicing enforcement algorithm, which in turn could decide to assign subcarriers to MUs according to its own internal resource allocation and scheduling policy.

Figure 13:
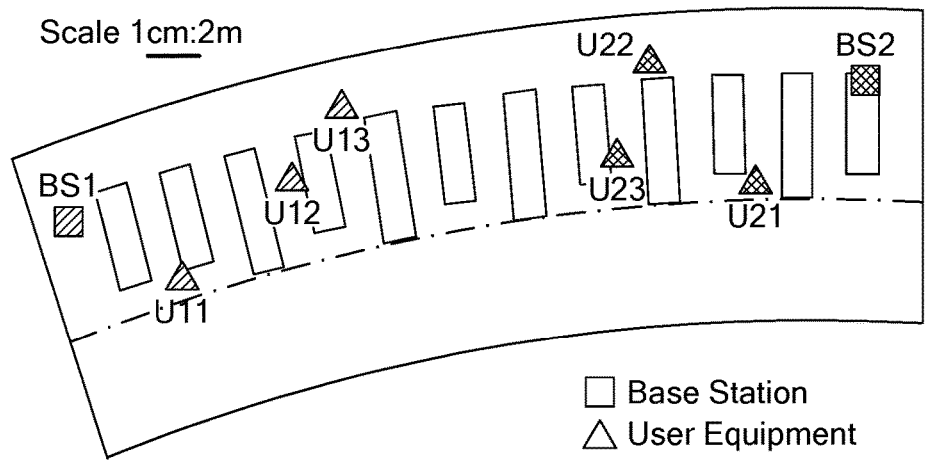
FIG. 13 is a schematic illustration of an experimental testbed.

A testbed of 8 USRP software-defined radios was set up for the experiments. Two USRP X310 acted as BSs, 6 USRP N210 were used to implement MUs and all of them ran GNU Radio. The USRP radios were deployed as shown in FIG. 13, which shows two groups of three N210s associated with each BS. The BSs were synchronized in time and phase by using an Octoclock clock distributor by Ettus Research.

2. Experimental Results

The experiments were targeted to evaluate two performance parameters:
1) the effectiveness of the slicing enforcement algorithms in assigning the spectrum resources (i.e., the RBs) to the MVNOs according to the slicing policy;
2) the performance (i.e., total network throughput) of RSEP-QP as opposed to sub-optimal algorithms.

To address point 1), a network with three MVNOs and 6 MUs was considered, where each MU was associated with a different MVNO in each BS (e.g., $U_{11}$ was associated with MVNO 1 and BS1, while $U_{23}$ with MVNO 3 and BS2). The case was considered where the two BSs enforced the following slicing policies on the three MVNOs, which change every T=300 s, by using the RSEP-QP algorithm.
1) BS1: {70, 30, 0}%; {25, 25, 50}%; {30, 40, 30}%.
2) BS2: {25, 25, 50}%; {30, 40, 30}%; {70, 30, 0}%.

Figure 14:
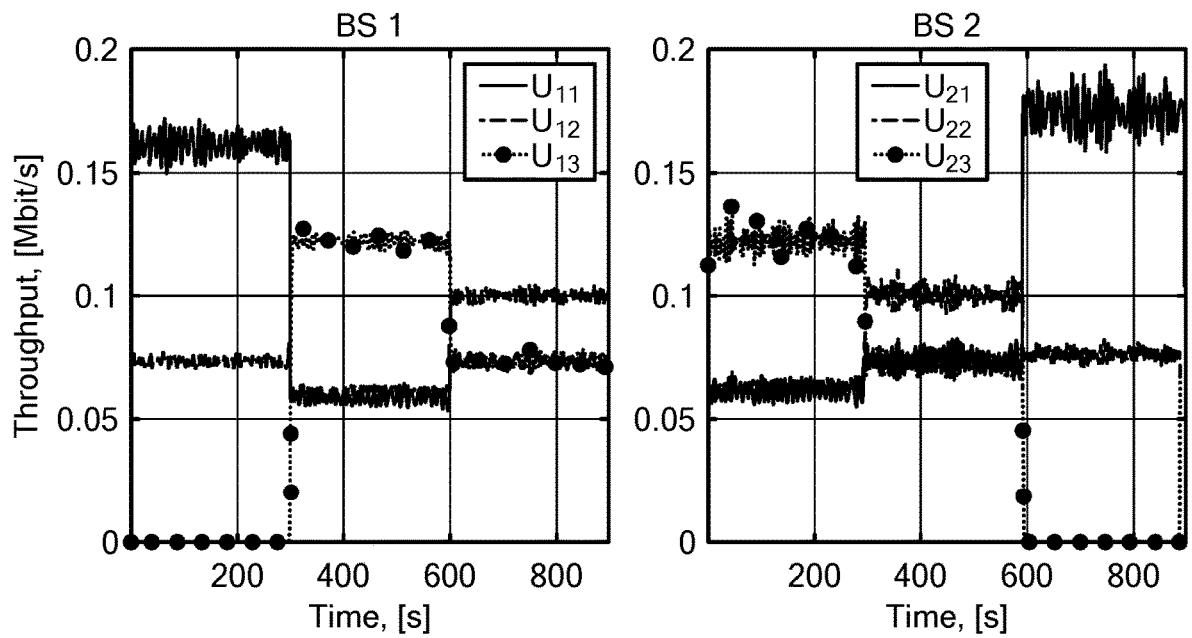
FIG. 14 is a graph of throughput per MU as a function of time and MUs.

FIG. 14 depicts the throughput experienced by each MU as a function of time at BS1 and BS2, averaged over 10 repetitions. The sharp change in throughput corresponding to different slicing policies in FIG. 14 indicates that the RSEP-QP slicing enforcement algorithm indeed assigned to each MVNO (and therefore each MU) a number of RBs that was coherent to that expressed in the slicing policy.

In addressing point 2), the same network scenario was considered as in 1). However, to remark the difference between the optimum and the sub-optimal algorithms, 9 MVNOs were considered instead of 3. The MVNOs were assigned the following slicing policy at the two BSs:
1) BS1: {7, 10, 18, 7, 3, 6, 23, 14, 12}%;
2) BS2: {5, 3, 16, 13, 10, 5, 30, 7, 11}%.

Furthermore, the following IBSPC policy was considered: when two MVNOs have matching RBs at the two BSs, a power control policy was computed that reduced the transmission power to keep the mutual interference below a fixed threshold.

Figure 15:
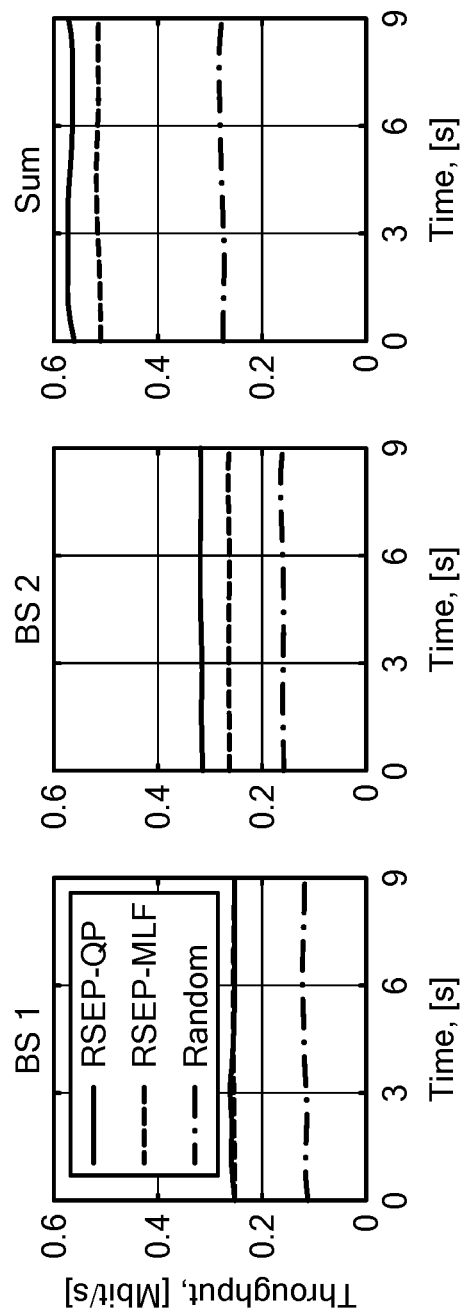
FIG. 15 are graphs of total network throughput for different slicing enforcement algorithms.

FIG. 15 shows the total network throughput as a function of time, for the RSEP-QP, RSEP-MLF and Random policies, averaged over 100 repetitions. The results indicate that (i) the throughput increase by using IBSPC in conjunction to an optimal slicing enforcement technique can help increase the total network throughput dramatically with respect to approaches that assign RBs to MVNOs in sub-optimal fashion. The experiments confirmed that RSEP-QP doubled the throughput with respect to the Random baseline, and that the RSEP-MLF algorithm approximated well the RSEP-QP algorithm. These results were a consequence of the fact that the RBs shared by the MVNOs are respectively 96, 79, and 13 in the case of RSEP-QP, RSEP-MLF and Random; therefore, the opportunity of IBSPC was significantly higher in the former two.

Example 2

1. Experimental Setup

To demonstrate the superior performance of the techniques herein, a standard-compliant LTE cellular network on the Arena testbed was instantiated. Arena is an experimental software-defined radio (SDR) testbed used to facilitate prototyping and performance evaluation of algorithms and protocols for sub-6 GHz applications in a real-world wireless environment. Arena included N210 and X310 USRPs whose antennas were connected to the ceiling of a 2240 square feet office space. USRPs were controlled via software by GPU-enabled high-computational power Dell EMC PowerEdge R340 servers.

To deploy a standard-compliant LTE network, srsLTE and OpenAirInterface (OAI) open-source software was used, which offered LTE-compliant base stations (eNBs) and UEs protocol stack implementations, as well as an Evolved Packet Core (EPC) application. Implementation details and report results obtained through the srsLTE implementation are discussed here; however, both the implementation and obtained results on OAI were equivalent to those of srsLTE.

Figure 16:
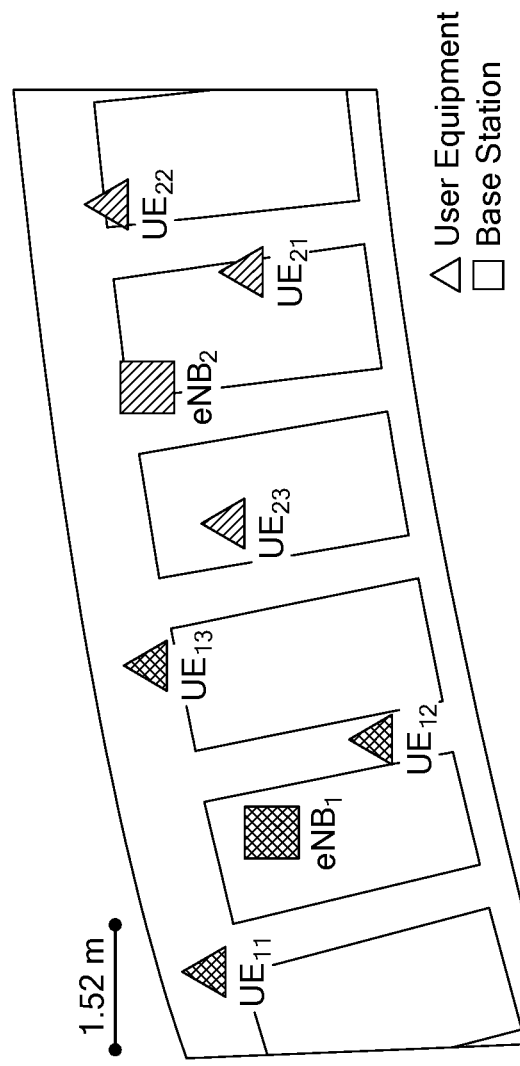
FIG. 16 is a schematic illustration of a further experimental testbed.

Two standard-compliant eNBs on Arena X310 SDR Ettus Research USRPs serving 6 COTS UEs (Xiaomi Redmi Go) were deployed. The deployed LTE network is shown in FIG. 16, where $UE_{xy}$ is served by $eNB_x$, with $x \in \{1, 2\}$, $y \in \{1, 2, 3\}$.

2. Integrating RAN Slicing in srsLTE

Figure 17:
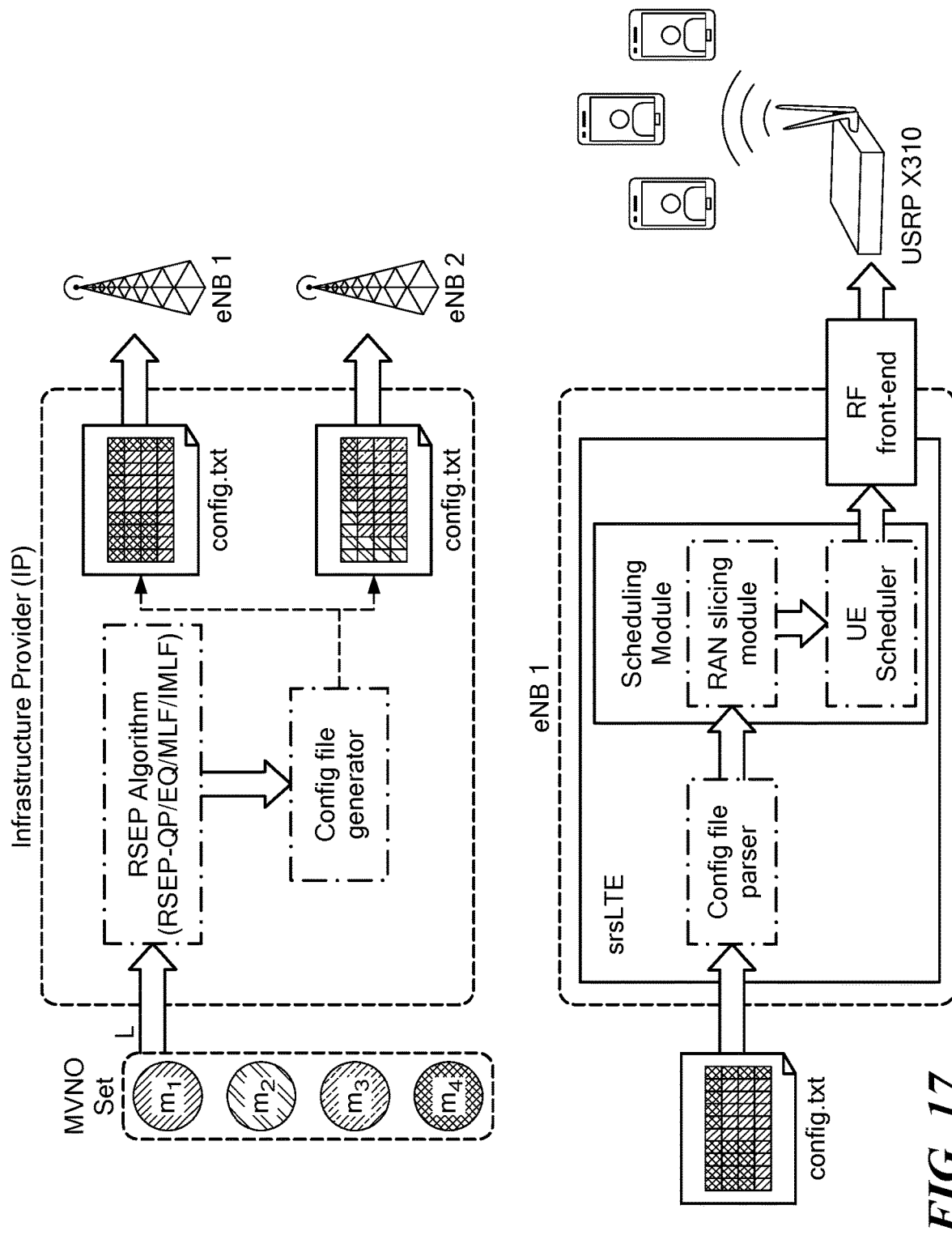
FIG. 17 is a schematic overview and integration with srsLE.

In order to demonstrate the superior performance of the RAN slicing algorithms herein with respect to traditional interference-agnostic slicing approaches, srsLTE functionalities were extended by integrating RAN slicing mechanisms at each eNB. An overview of the extended framework is shown in FIG. 17. Highlighted blocks outlined in a dot dash line indicate software components to integrate RAN slicing functionalities within the srsLTE framework.

In each experiment, the IP received RAN slice requests generated by a set of MVNOs. Each RAN slice request specified which eNBs should be included in the slice, and the number of RBs that should be assigned to the slice on each eNB. Upon reception of these requests, the IP executed one of the RAN slicing enforcement techniques to assign the available RBs to the requesting MVNOs such that the number of linked RBs was maximized. The solution was then converted into a set of B configuration files (i.e., the config.txt files in FIG. 17). Each configuration files was associated to individual eNBs and specified which RBs should be assigned to each slice. These files were then dispatched to the corresponding eNB and processed by a config file parser module. RAN slicing enforcement information was then fed to a RAN slicing module that instantiated RAN slices and exclusively assigned RBs to each of them according to the configuration specified in the config.txt file. Finally, RBs assigned to each RAN slice were used by individual MVNOs to schedule UE downlink transmissions performed by USRPs or Arena.

3. Experimental Results

The case was considered where two MVNOs lease eNB resources (i.e., RBs) to instantiate RAN slices. The experiments were targeted at evaluating two critical performance parameters, i.e., network throughput and SINR experienced by UEs. The effectiveness of the techniques was demonstrated by comparing the optimal RSEP-QP technique described herein with a traditional technique (i.e., w/o isolation) in which RAN slices were instantiated without leveraging network topology information and enforcing slice isolation.

Ten experiments were run on the testbed illustrated in FIG. 16. At each experiment run, a random slicing profile L was generated in MATLAB. To provide a fair comparison between different approaches, for each L, RAN slicing enforcement policies were computed by using the technique presented herein (i.e., RSEP-QP) and traditional ones (i.e., w/o isolation). Mobile users performed a 2-minute long speed-test and reported both throughput and SINR measurements. To avoid time-varying performance degradation introduced by internet connectivity, which would result in unfair comparison between the two methods, the speed-test server was locally hosted on the Arena testbed.

Figure 18:
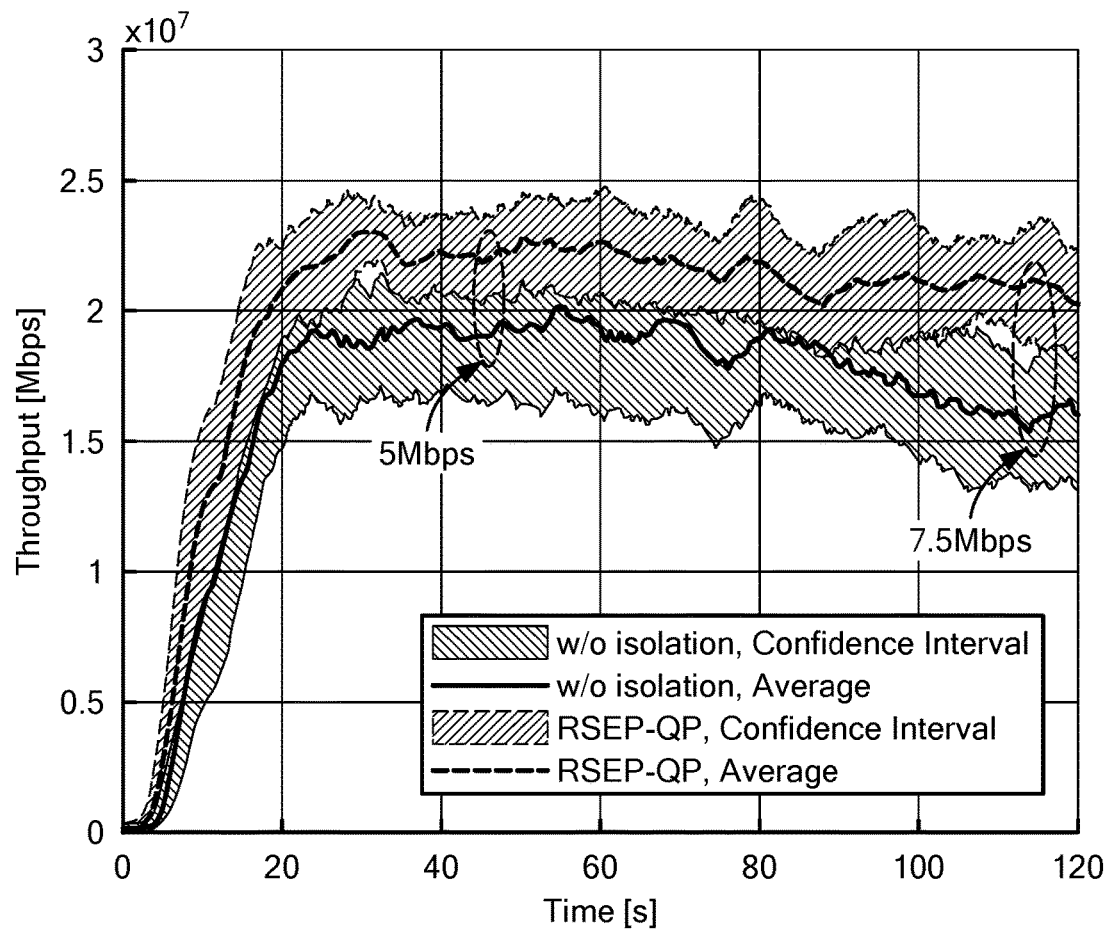
FIG. 18 is a graph of experimental throughput comparison of RSEP-EQ (dashed line) and traditional technique ("w/o isolation") (solid line).

The average throughput over the 10 experiments is reported in FIG. 18. The results show that the approach herein (i.e., RSEP-QP) outperformed traditional interference-agnostic approaches and increased throughput by approximately 27% (approximately 5 Mbps gain) with peak throughput gains up to 7.5 Mbps.

Figure 19:
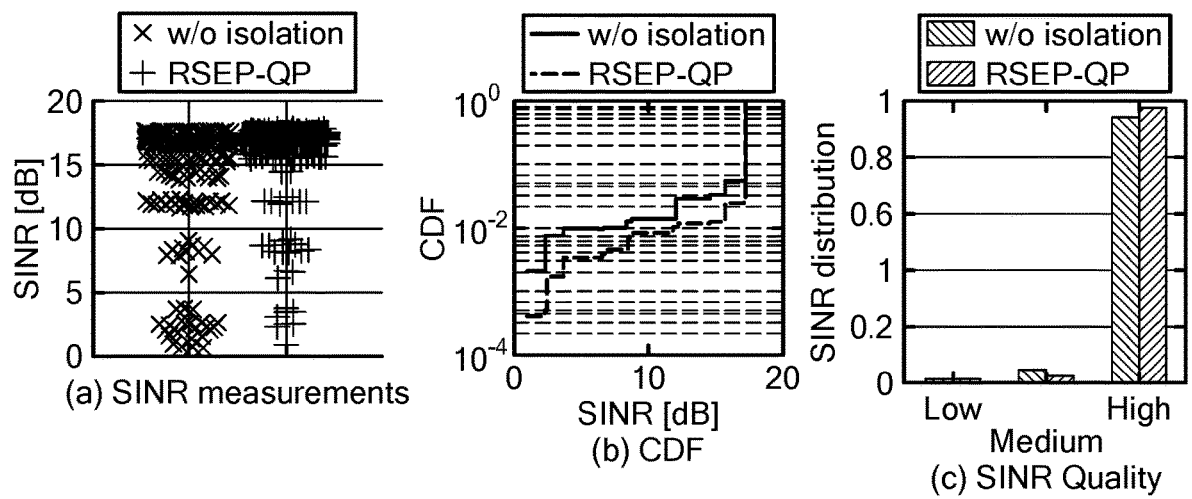
FIG. 19 illustrates graphs of experimental SINR analysis.

In FIG. 19, SINR measurements reported by UEs were analyzed under the two considered methods (FIG. 19a). The Cumulative Distribution Function (CDF) of the SINR shown in FIG. 19b demonstrated that traditional approaches are subject to poor SINR performance due to high interference across heterogeneous RAN slices. The approach herein, instead, effectively reduced such interference and improved the SINR experienced by UEs. This can be noticed in FIG. 19c, which shows the ratio of users reporting Low (SINR≤5 dB), Medium (5 dB<SINR≤17 dB) and High (SINR>17 dB) SINR. FIG. 19c shows that the approach herein resulted in a larger portion of UEs reporting higher SINR if compared to the traditional approach which, instead, shows higher percentage of UEs reporting low and medium SINR levels.

Example 3

Figure 20:
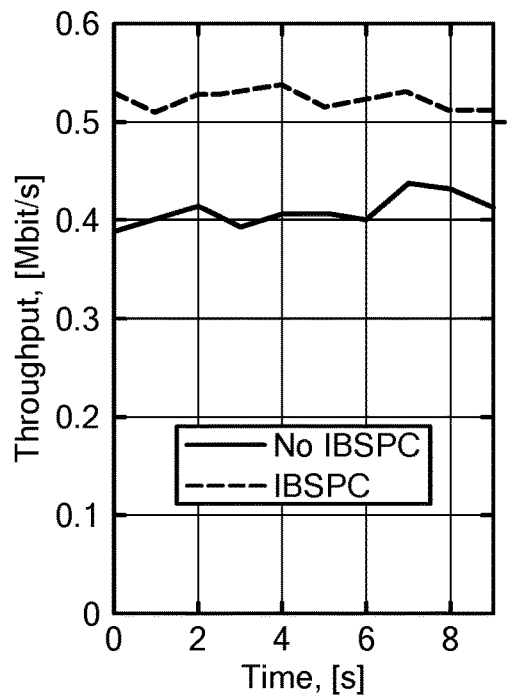
FIG. 20 is a graph of experimental results of throughput vs. time for inter-base-station power control (IBSPC) and no IBSPC.

To further investigate the issue of inter-MVNO interference, a series of experiments were run on the testbed described in Example 1 (FIG. 13). In these experiments, the RBs were assigned randomly to MVNOs according to the percentage defined in the slicing policy. Channel estimation was performed and then IBSPC was applied to keep intercell interference below a fixed threshold. FIG. 20, which depicts the total network throughput as a function of time, indicates that by using IBSPC, the network increased its throughput by about 25%.

Example 4

Figure 21:
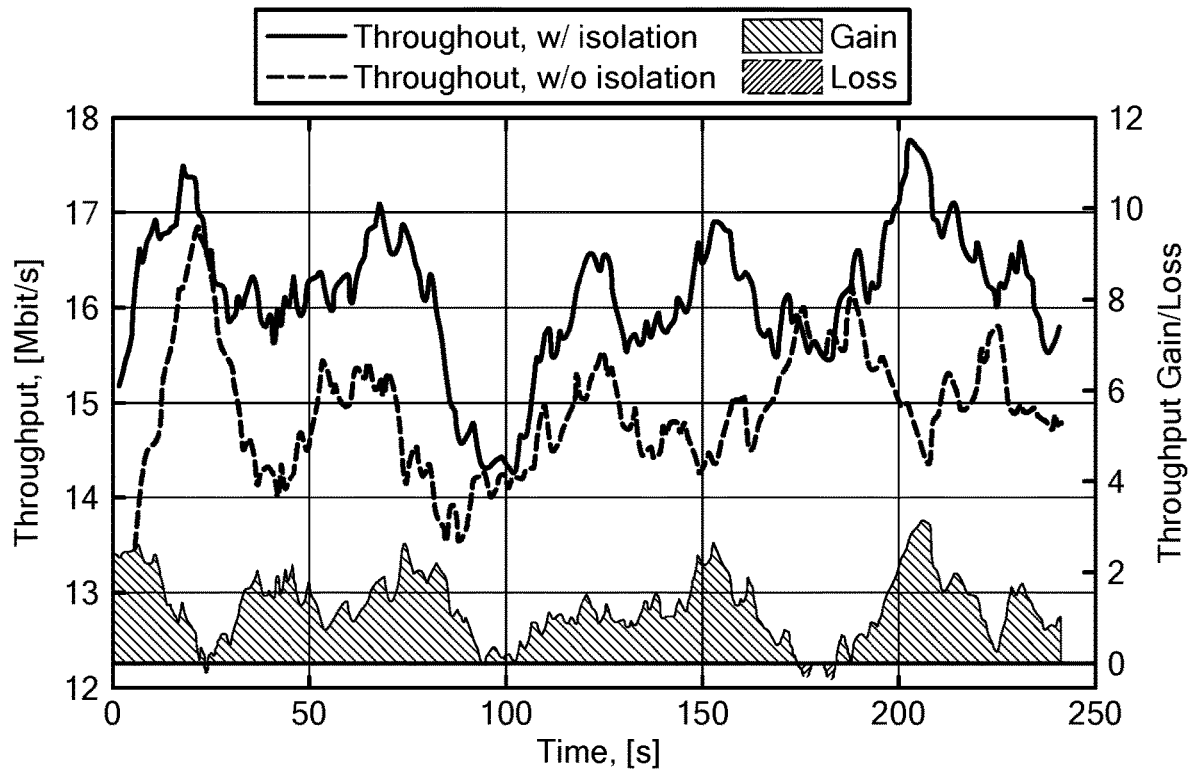
FIG. 21 is a graph of impact of coordination-based slicing on network throughput. Lines represent throughput measurements; shaded areas indicate gains and losses.

To further demonstrate the negative impact of inter-MVNO interference, a series of experiments were run on the LTE-compliant testbed described in Example 2 (FIG. 16). In such experiments, two LTE base stations were deployed and two RAN slices controlled by MVNOs M1 and M2, respectively, were instantiated. Each slice was assigned with 50% of the available RBs and served a set of mobile users (i.e., commercial LTE smart-phones). FIG. 21 shows the aggregated throughput of the network. Specifically, the experiments compared measured throughput of RBs allocated to minimize inter-MVNO interference as in FIG. 1(a) and measured throughput without slice isolation (FIG. 1(b)). It can be seen that slice isolation considerably improved network throughput and provided a throughput gain up to 3 Mbit/s.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It is to be understood that the present technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A method of allocating radio access network (RAN) spectrum resources among a plurality of mobile virtual network operators (MVNOs) of a network of base stations, each base station operative to transmit and receive signals over a coverage area, comprising:
determining a slicing enforcement policy comprising assigning a set of one or more resource blocks (RBs) to each MVNO according to a slicing policy in which each MVNO is allocated an amount of the spectrum resources on at least one base station in a determined time span, each resource block including a number of available frequency units and time slots of the spectrum resources, subject to minimizing interference between each MVNO's set of RBs with another MVNO's set of RBs on an interfering base station, wherein adjacent base stations are interfering when coverage areas of the adjacent base stations overlap;
generating a RAN slicing enforcement problem (RSEP) comprising:
determining a feasible slicing enforcement policy that maximizes a total number of linked RBs allocated to MVNOs that request a highest amount of resource blocks on multiple interfering base stations, wherein the linked RBs have a same frequency unit and a same time slot in interfering base stations,
generating a linking index for each MVNO based on a size of a request by each MVNO for resource blocks on multiple interfering base stations, and
allocating resource blocks in sequential order starting with an MVNO with a highest linking index;
generating a RB allocation matrix of allocated RBs having rows corresponding to base stations;
removing a row with a smallest number of distinct MVNOs;
swapping elements of the RB allocation matrix;
updating the RB allocation matrix if a total number of linked RBs is increased;
assigning the RBs to the MVNOs according to the RSEP; and
allocating the resource blocks of the spectrum resources to each MVNO based on the slicing enforcement policy.

2. The method of claim 1, wherein step (a) further comprises:
assigning to at least one of the MVNOs a plurality of linked RBs, wherein the linked RBs have a same frequency unit and a same time slot in interfering base stations; and maximizing a number of linked RBs assigned to a same MVNO on interfering base stations.

3. The method of claim 1, wherein step (a) further comprises:
generating a set of slicing profiles for each of the MVNOs and the plurality of base stations, the slicing profile comprising the amount of the spectrum resources to allocated to each MVNO on each base station in a determined time span; and
maximizing a number of linked RBs for each MVNO from a set of feasible slicing enforcement policies, wherein the linked RBs have a same frequency unit and a same time slot in interfering base stations.

4. The method of claim 1, wherein generating the RSEP further comprises maximizing a number of linked RBs for each MVNO based on a selected binary resource block allocation indicator x, wherein x=1 for each resource block that has been allocated to a particular MVNO, subject to ensuring that all MVNOs receive an assigned number of resource blocks and that each resource block is allocated to only one MVNO.

5. The method of claim 1, wherein generating the RSEP further comprises maximizing a number of linked RBs for each MVNO based on a selected resource block allocation indicator x, wherein x is approximated by a linear relaxation so that $0 \leq x \leq 1$ for each resource block that has been allocated to a particular MVNO, subject to ensuring that all MVNOs receive an assigned number of resource blocks and that each resource block is allocated to only one MVNO.

6. The method of claim 1, wherein generating the RSEP further comprises aggregating RBs into a group if a number of RBs or a number of time slots T are proportional to a greatest common divisor of all elements in a slicing profile matrix L of amounts of resources allocable to each MVNO on each base station in a determined time span.

7. The method of claim 1, wherein step (a) further comprises maximizing a number of simultaneous transmissions on different base stations by any one or more of the MVNOs.

8. The method of claim 1, wherein step (a) further comprises allocating the spectrum resources according to a transmission strategy implemented by one or more of the MVNOs, the transmission strategy comprising one or more of an inter-base-station power control scheme, a multiple-input multiple output scheme, a coordinated multi-point scheme, a joint transmission scheme, and coordinated beamforming.

9. The method of claim 1, wherein step (a) further comprises allocating the spectrum resources according to requests from the MVNOs.

10. A system of allocating radio access network (RAN) spectrum resources among a plurality of mobile virtual network operators (MVNOs) of a network of base stations, each base station operative to transmit and receive signals over a coverage area, comprising:
a computer system comprising one or more processors and memory, and machine-readable instructions stored in the memory that upon execution by the one or more processors cause the system to carry out operations comprising:
determining a slicing enforcement policy comprising assigning a set of one or more resource blocks (RBs) to each MVNO according to a slicing policy in which each MVNO is allocated an amount of the spectrum resources on at least one base station in a determined time span, each resource block including a number of available frequency units and time slots of the spectrum resources, subject to minimizing interference between each MVNO's set of RBs with another MVNO's set of RBs on an interfering base station, wherein adjacent base stations are interfering when coverage areas of the adjacent base stations overlap;
generating a RAN slicing enforcement problem (RSEP) comprising:
determining a feasible slicing enforcement policy that maximizes a total number of linked RBs allocated to MVNOs that request a highest amount of resource blocks on multiple interfering base stations, wherein the linked RBs have a same frequency unit and a same time slot in interfering base stations,
generating a linking index for each MVNO based on a size of a request by each MVNO for resource blocks on multiple interfering base stations, and
allocating resource blocks in sequential order starting with an MVNO with a highest linking index;
generating a RB allocation matrix of allocated RBs having rows corresponding to base stations;
removing a row with a smallest number of distinct MVNOs;
swapping elements of the RB allocation matrix;
updating the RB allocation matrix if a total number of linked RBs is increased;
assigning the RBs to the MVNOs according to the RSEP; and
allocating the resource blocks of the spectrum resources to each MVNO based on the slicing enforcement policy.

11. The system of claim 10, wherein step (a) further comprises:
assigning to at least one of the MVNOs a plurality of linked RBs, wherein the linked RBs have a same frequency unit and a same time slot in interfering base stations; and
maximizing a number of linked RBs assigned to a same MVNO on interfering base stations.

12. The system of claim 10, wherein step (a) further comprises:
generating a set of slicing profiles for each of the MVNOs and the plurality of base stations, the slicing profile comprising the amount of the spectrum resources to allocated to each MVNO on each base station in a determined time span; and
maximizing a number of linked RBs for each MVNO from a set of feasible slicing enforcement policies, wherein the linked RBs have a same frequency unit and a same time slot in interfering base stations.

13. The system of claim 10, wherein generating the RSEP further comprises:
maximizing a number of linked RBs for each MVNO based on a selected binary resource block allocation indicator x, wherein x=1 for each resource block that has been allocated to a particular MVNO, subject to ensuring that all MVNOs receive an assigned number of resource blocks and that each resource block is allocated to only one MVNO; or
maximizing a number of linked RBs for each MVNO based on a selected resource block allocation indicator x, wherein x is approximated by a linear relaxation so that $0 \leq x \leq 1$ for each resource block that has been allocated to a particular MVNO, subject to ensuring that all MVNOs receive an assigned number of resource blocks and that each resource block is allocated to only one MVNO.

14. The system of claim 10, wherein generating the RSEP further comprises:
aggregating RBs into a group if a number of RBs or a number of time slots T are proportional to a greatest common divisor of all elements in a slicing profile matrix L of amounts of resources allocable to each MVNO on each base station in a determined time span; or
determining non-zero entries of matrices of elements representing interfering base station, a number of RBs, a number of time slots and a number of MVNOs.

15. A method of allocating radio access network (RAN) spectrum resources among a plurality of mobile virtual network operators (MVNOs) of a network of base stations, each base station operative to transmit and receive signals over a coverage area, comprising:
determining a slicing enforcement policy comprising assigning a set of one or more resource blocks (RBs) to each MVNO according to a slicing policy in which each MVNO is allocated an amount of the spectrum resources on at least one base station in a determined time span, each resource block including a number of available frequency units and time slots of the spectrum resources, subject to minimizing interference between each MVNO's set of RBs with another MVNO's set of RBs on an interfering base station, wherein adjacent base stations are interfering when coverage areas of the adjacent base stations overlap;
generating a RAN slicing enforcement problem (RSEP) comprising:
determining a feasible slicing enforcement policy that maximizes a total number of linked RBs allocated to MVNOs that request a highest amount of resource blocks on multiple interfering base stations, wherein the linked RBs have a same frequency unit and a same time slot in interfering base stations, and
determining non-zero entries of matrices of elements representing interfering base station, a number of RBs, a number of time slots and a number of MVNOs;
assigning the RBs to the MVNOs according to the RSEP; and
allocating the resource blocks of the spectrum resources to each MVNO based on the slicing enforcement policy.

16. A system of allocating radio access network (RAN) spectrum resources among a plurality of mobile virtual network operators (MVNOs) of a network of base stations, each base station operative to transmit and receive signals over a coverage area, comprising:
a computer system comprising one or more processors and memory, and machine-readable instructions stored in the memory that upon execution by the one or more processors cause the system to carry out operations comprising:
determining a slicing enforcement policy comprising assigning a set of one or more resource blocks (RBs) to each MVNO according to a slicing policy in which each MVNO is allocated an amount of the spectrum resources on at least one base station in a determined time span, each resource block including a number of available frequency units and time slots of the spectrum resources, subject to minimizing interference between each MVNO's set of RBs with another MVNO's set of RBs on an interfering base station, wherein adjacent base stations are interfering when coverage areas of the adjacent base stations overlap;
generating a RAN slicing enforcement problem (RSEP) comprising:
determining a feasible slicing enforcement policy that maximizes a total number of linked RBs allocated to MVNOs that request a highest amount of resource blocks on multiple interfering base stations, wherein the linked RBs have a same frequency unit and a same time slot in interfering base stations, and
determining non-zero entries of matrices of elements representing interfering base station, a number of RBs, a number of time slots and a number of MVNOs;
assigning the RBs to the MVNOs according to the RSEP; and
allocating the resource blocks of the spectrum resources to each MVNO based on the slicing enforcement policy.

* * * * *